US007159805B2

(12) United States Patent
Reher et al.

(10) Patent No.: US 7,159,805 B2
(45) Date of Patent: Jan. 9, 2007

(54) METHODS OF MODIFYING FIBERS

(75) Inventors: Ronald D. Reher, Corvallis, OR (US);
John D. Windisch, Corvallis, OR (US);
Steven J. Russell, Independence, OR (US)

(73) Assignee: Evanite Fiber Corporation, Corvallis, OR (US)

( * ) Notice: Subject to any disclaimer, the term of this patent is extended or adjusted under 35 U.S.C. 154(b) by 914 days.

(21) Appl. No.: 10/105,205

(22) Filed: Mar. 25, 2002

(65) Prior Publication Data

US 2003/0182972 A1  Oct. 2, 2003

(51) Int. Cl.
*B02C 19/00* (2006.01)

(52) U.S. Cl. ........................................ 241/30

(58) Field of Classification Search ............ 65/482, 65/483; 100/39; 428/392; 241/270, 271, 241/262, 30, 26, 99, 199.11
See application file for complete search history.

(56) References Cited

U.S. PATENT DOCUMENTS

| 2,107,937 | A | 2/1938 | Hall |
| 2,564,707 | A | 8/1951 | Mochel |
| 3,859,135 | A | 1/1975 | Roberts et al. |
| 4,039,730 | A | 8/1977 | Brinkmann et al. |
| 4,046,539 | A | 9/1977 | Pitt |
| 4,119,772 | A | 10/1978 | Peters et al. |
| 4,188,268 | A | 2/1980 | Sugahara et al. |
| 4,230,779 | A | 10/1980 | Varma |
| 4,315,829 | A | 2/1982 | Duddy et al. |
| 4,323,470 | A | 4/1982 | Mahato et al. |
| 4,336,314 | A | 6/1982 | Yonezu et al. |
| 4,353,969 | A | 10/1982 | Rippel et al. |
| 4,391,036 | A | 7/1983 | Kishimoto et al. |
| 4,414,295 | A | 11/1983 | Uba |
| 4,414,297 | A | 11/1983 | Fischer |
| 4,507,372 | A | 3/1985 | Rowlette |
| 4,510,219 | A | 4/1985 | Rowlette |
| 4,510,252 | A | 4/1985 | Potter |
| 4,588,015 | A | 5/1986 | Liebermann |
| 4,606,982 | A | 8/1986 | Nelson et al. |
| 4,627,868 | A | 12/1986 | Kaveh |
| 4,631,241 | A | 12/1986 | Kawanami |
| 4,725,516 | A | 2/1988 | Okada et al. |
| 4,735,870 | A | 4/1988 | Rowlette |
| 4,787,125 | A | 11/1988 | Pinsky et al. |
| 4,861,689 | A | 8/1989 | Clough et al. |
| 4,865,933 | A | 9/1989 | Blanyer et al. |
| 4,873,161 | A | 10/1989 | Rippel et al. |
| 4,909,955 | A | 3/1990 | Morris et al. |
| 5,009,971 | A | 4/1991 | Johnson et al. |
| 5,035,966 | A | 7/1991 | Tokunaga et al. |
| 5,075,184 | A | 12/1991 | Tanaka et al. |

(Continued)

FOREIGN PATENT DOCUMENTS

DE  3532697  4/1987

(Continued)

OTHER PUBLICATIONS

Bullock, KR. et al., "Positive Plate Additives to Enhance Formation and Battery Performance", *Battery Council International, C&D Technologies, Inc.* Conshohochen, Pennsylvania, pp. 1-29.

(Continued)

*Primary Examiner*—Mark Rosenbaum
(74) *Attorney, Agent, or Firm*—Fish & Richardson P.C.

(57) ABSTRACT

Methods of modifying fibers, such as glass fibers, are disclosed. The modified fibers can be used, for example, in a lead acid battery.

27 Claims, 17 Drawing Sheets

U.S. PATENT DOCUMENTS

| | | |
|---|---|---|
| 5,076,826 A | 12/1991 | Teeter |
| 5,114,806 A | 5/1992 | Chiacchio et al. |
| 5,126,218 A | 6/1992 | Clarke |
| 5,182,165 A | 1/1993 | Clough et al. |
| 5,204,140 A | 4/1993 | Grosvenor et al. |
| 5,206,100 A | 4/1993 | Muto et al. |
| 5,219,676 A | 6/1993 | Bullock et al. |
| 5,223,352 A | 6/1993 | Pitts et al. |
| 5,225,298 A | 7/1993 | Nakayama et al. |
| 5,302,476 A | 4/1994 | Kao et al. |
| 5,336,275 A | 8/1994 | Zguris et al. |
| 5,348,817 A | 9/1994 | Rao et al. |
| 5,368,960 A | 11/1994 | Rowlette |
| 5,368,961 A | 11/1994 | Juergens |
| 5,376,479 A | 12/1994 | Gerner |
| 5,449,574 A | 9/1995 | Higley |
| 5,468,572 A | 11/1995 | Zguris et al. |
| 5,474,863 A | 12/1995 | Yamamoto |
| 5,547,783 A | 8/1996 | Funato et al. |
| 5,645,959 A | 7/1997 | Rowlette |
| 5,660,949 A | 8/1997 | Lajeunesse |
| 5,667,917 A | 9/1997 | Edwards et al. |
| 5,677,078 A | 10/1997 | Juergens et al. |
| 5,705,265 A | 1/1998 | Clough et al. |
| 5,759,716 A | 6/1998 | Clough |
| 5,766,789 A | 6/1998 | James et al. |
| 5,800,946 A | 9/1998 | Grosvenor et al. |
| 5,820,639 A | 10/1998 | Snyder et al. |
| 5,895,732 A | 4/1999 | Clough |
| 5,925,470 A | 7/1999 | Blanyer et al. |
| 5,998,062 A | 12/1999 | Olson |
| 6,004,689 A | 12/1999 | Walker et al. |
| 6,027,822 A | 2/2000 | Blanyer et al. |
| 6,029,477 A * | 2/2000 | Hanvey, Jr. .................. 65/483 |
| 6,051,335 A | 4/2000 | Dinh-Sybeldon et al. |
| 6,071,641 A | 6/2000 | Zguris |
| 6,077,623 A | 6/2000 | Grosvenor et al. |
| 6,117,196 A | 9/2000 | Snyder et al. |
| 6,124,059 A | 9/2000 | Böhnstedt et al. |
| 6,132,901 A | 10/2000 | Clough |
| 6,143,441 A | 11/2000 | Zguris et al. |
| 6,168,886 B1 | 1/2001 | Clough |
| 6,180,286 B1 | 1/2001 | Rao et al. |
| 6,187,478 B1 | 2/2001 | Clough et al. |
| 6,190,799 B1 | 2/2001 | Clough |
| 6,199,778 B1 * | 3/2001 | Hanvey, Jr. .................. 241/19 |
| 6,268,081 B1 | 7/2001 | Clough |
| 6,306,539 B1 | 10/2001 | Zguris |
| 6,708,912 B1 * | 3/2004 | Bascom et al. ............. 241/295 |
| 2001/0016287 A1 | 8/2001 | Clough et al. |
| 2001/0016288 A1 | 8/2001 | Clough |
| 2001/0042288 A1 | 11/2001 | Omae et al. |
| 2001/0046627 A1 | 11/2001 | Clough et al. |

FOREIGN PATENT DOCUMENTS

| | | |
|---|---|---|
| EP | 0 127 301 | 12/1984 |
| EP | 0 352 115 | 1/1990 |
| EP | 0 377 828 | 7/1990 |
| EP | 0 553 430 | 8/1993 |
| EP | 0 608 590 | 8/1994 |
| EP | 0 680 105 | 11/1995 |
| EP | 0 736 922 | 10/1996 |
| EP | 0 868 757 B1 | 5/2004 |
| GB | 1 572 333 | 7/1980 |
| JP | 55-66865 | 5/1980 |
| JP | 55-86066 | 6/1980 |
| JP | 55-108175 | 8/1980 |
| JP | 55-139765 | 10/1980 |
| JP | 57-147871 | 9/1982 |
| JP | 57-162259 | 10/1982 |
| JP | 58-035867 | 3/1983 |
| JP | 58-35867 | 3/1983 |
| JP | 60-28171 | 2/1985 |
| JP | 62-160659 | 7/1987 |
| JP | 1-134865 | 5/1989 |
| JP | 9-92252 | 4/1997 |
| JP | 9-92268 | 4/1997 |
| JP | 9-115581 | 5/1997 |
| JP | 9-134716 | 5/1997 |
| JP | 9-289035 | 11/1997 |
| JP | 10-40922 | 2/1998 |
| JP | 10-50337 | 2/1998 |
| JP | 10-92421 | 4/1998 |
| JP | 10-134794 | 5/1998 |
| JP | 10-134803 | 5/1998 |
| JP | 10-199562 | 7/1998 |
| JP | 10-321234 | 12/1998 |
| JP | 3-123744 | 4/2003 |
| JP | 2003-223894 | 8/2003 |
| WO | WO 93/23885 | 11/1993 |
| WO | WO 97/11501 | 3/1997 |
| WO | WO 98/00875 | 1/1998 |
| WO | WO 98-43309 | 10/1998 |
| WO | WO 99/12219 | 3/1999 |
| WO | WO 00/65629 | 11/2000 |
| WO | WO 01/26170 | 4/2001 |

OTHER PUBLICATIONS

Internet Printout. http://www.cementhai.co.th/products/fiber. SFG Insulation.

Internet Printout. http://www.zoltek.com/technical. Zoltek Composite Design Manual.

Vinal, GW. et al., "Note on the Effects of Cobalt and Nickel in Storage Batteries", *Journal of Research of the National Bureau Of Standards* vol. 25, pp. 417-420; 1940.

Williams, FJ. et al., "Lead-Nickel Glass of controlled Chemical Durability for Storage Battery Use" *Journa of the American Ceramic Society* vol. 29, pp. 313-316; 1946.

* cited by examiner

METHODS OF MODIFYING FIBERS

TECHNICAL FIELD

The invention relates to methods of modifying fibers, such as glass fibers. The modified fibers can be used, for example, in a lead acid battery.

BACKGROUND

Batteries are commonly used as energy sources. Typically, a battery includes a negative electrode (anode) and a positive electrode (cathode). The anode and cathode are often disposed in an electrolytic solution. During discharge of a battery, a chemical reaction can occur that oxidizes an active anode material and reduces an active cathode material. During the reaction, electrons flow from the anode to the cathode, and ions in the electrolytic solution flow between the anode and the cathode. Certain batteries can be recharged by running the chemical reaction in reverse.

One type of battery is a lead acid battery. In a lead acid battery, lead is usually an active anode material, and lead dioxide is usually an active cathode material. Generally, lead acid batteries also contain sulfuric acid, which serves as an electrolyte and participates in the chemical reaction. A typical discharge reaction for a lead acid battery reaction is:

Anode: $Pb(s) + HSO_4^-(aq) \rightarrow PbSO_4(s) + H^+ + 2e^-$

Cathode: $PbO_2(s) + 3H^+(aq) + HSO_4^-(aq) + 2e^- \rightarrow PbSO_4(s) + 2H_2O$ Net: $Pb(s) + PbO_2(s) + 2H^+(aq) + 2HSO_4^-(aq) \rightarrow 2PbSO_4(s) + 2H_2O$

SUMMARY

The invention relates to methods of modifying fibers, such as glass fibers. As an example, the modified fibers can be used in one or more of the electrodes in a battery (e.g., anode(s) and/or cathode(s) in a lead acid battery). Alternatively or additionally, the modified fibers can be disposed in a paste used to form one or more of the electrodes in a lead acid battery (e.g., anode(s) and/or cathode(s) in lead acid batteries).

In one aspect, the invention features a method of modifying a plurality of fibers. The method includes applying pressure at more than one angle to the plurality of fibers. The plurality of fibers has an average length of greater than 1.5 millimeters before applying pressure and an average length of less than 1.5 millimeters after applying pressure.

In another aspect, the invention features a method of modifying a plurality of fibers. The method includes applying pressure to the plurality of fibers. The plurality of fibers has a first average length before applying pressure and a second average length after applying pressure. The first average length is at least 15 times greater than the second average length.

In another aspect, the invention features a method of modifying a plurality of fibers. The method includes applying a first pressure to the plurality of fibers, and removing the first pressure from the plurality of fibers. The method further includes rotating the plurality of fibers, and applying a second pressure to the plurality of fibers. The plurality of fibers has a first average length before applying the first pressure and a second average length after applying the second pressure. The first average length is greater than the second average length.

In another aspect, the invention features a composition that includes an active lead electrode material and fibers. The fibers have an average length of from 0.1 millimeter to 1.5 millimeters.

In another aspect, the invention features a paste that includes a lead material and fibers. The fibers have an average length of from 0.1 millimeter to 1.5 millimeters.

In another aspect, the invention features an electrode including a support and an active lead electrode material (e.g., lead or lead dioxide) disposed on the support. The active lead electrode material includes fibers having an average length of from 0.1 millimeter to 1.5 millimeters.

In another aspect, the invention features a battery that includes an anode and a cathode. The anode includes a support and an active electrode material disposed on the support. The active electrode material includes lead and fibers having an average length of from 0.1 millimeter to 1.5 millimeters.

In another aspect, the invention features a battery that includes an anode and a cathode. The cathode includes a support and an active electrode material disposed on the support. The active electrode material includes lead dioxide and fibers having an average length of from 0.1 millimeter to 1.5 millimeters.

In another aspect, the invention features a method that includes combining a lead material and fibers. The fibers have an average length of from 0.1 millimeter to 1.5 millimeters. The method can further include combining the lead material and fibers with water. The method can also include mixing the lead material, fibers and water. In addition, the method can include adding an acid (e.g., sulfuric acid).

In another aspect, the invention features a method that includes combining fibers and water, and combining the water and fibers with a lead material. The fibers have an average length of from 0.1 millimeter to 1.5 millimeters. The method can further include mixing the lead material, fibers and water. The method can also include adding an acid (e.g., sulfuric acid).

In another aspect, the invention features a composition that includes an active lead electrode material and fibers. The fibers have an average length of less than 1.5 millimeters and average diameter of at least one micron. The composition can be used, for example, in a battery electrode (e.g., anode and/or cathode of a lead acid battery).

In another aspect, the invention features a plurality of glass fibers having an average length of from 0.1 millimeter to 1.5 millimeters.

In another aspect, the invention features a plurality of glass fibers having an acid absorption of less than 1350%.

Generally, the fibers (e.g., glass fibers) are individual fibers that are grouped together. For example, the fibers (e.g., glass fibers) can be included in an enclosure that can be sold to a customer.

In certain embodiments, an electrode material containing the modified fibers can exhibit relatively high strength, such as by measured using vibration testing. This can reduce the pressure used to maintain good electrical contact between the electrode material and separators, which can reduce the likelihood of encountering problems associated with using larger pressures to maintain good electrical contact between the electrode material and separators.

In some embodiments, electrode material containing the modified fibers can exhibit relatively high initial specific capacity. This can be advantageous, for example, in applications where it is desirable to obtain a relatively large amount of energy from a lead acid battery in a relatively short period of time.

In certain embodiments, anode material containing the modified fibers can be relatively active toward oxidation. This can enhance the ability of the anode material to undergo oxidation (e.g., assist the formation of lead oxide from lead).

In some embodiments, electrode material containing the modified fibers can have a relatively open structure. This can, for example, assist in allowing the participants in the chemical reaction to access the electrode material.

In certain embodiments, electrode material containing the modified fibers can exhibit a relatively high charge acceptance.

Features, objects and advantages of the invention are in the description, drawings and claims.

DETAILED DESCRIPTION

Figure 1:
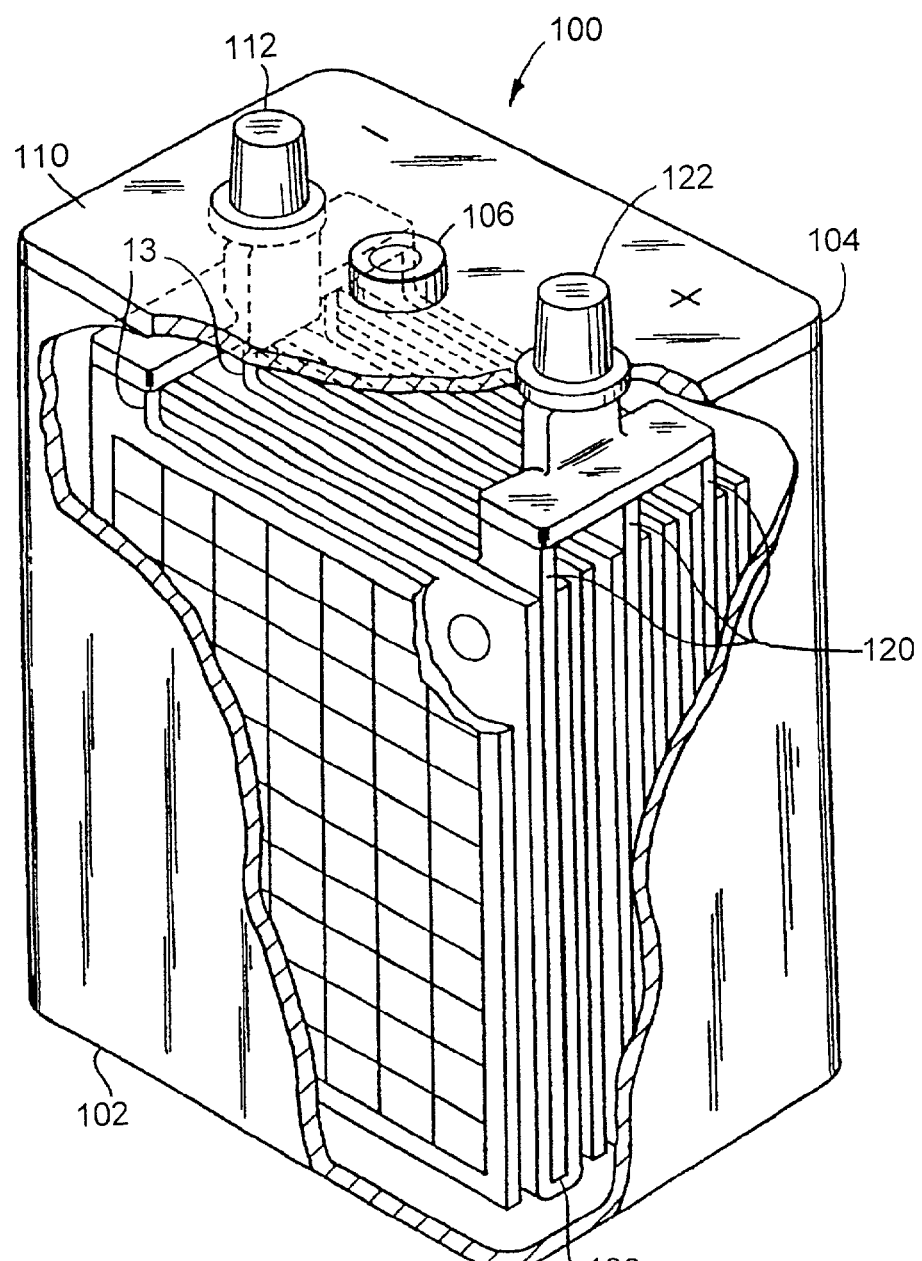
FIG. 1 is a partially cut away perspective view of an embodiment of a lead acid battery.

FIG. 1 shows a lead acid battery 100 including a case 102 with a top 104 having a boss 106 disposed therein. Case 102 contains anode plates 110 connected to a negative terminal 112, and cathode plates 120 connected to a positive terminal 122. Separators 130 are disposed between adjacent anode and cathode plates 110 and 120, respectively. Case 102 also contains sulfuric acid (e.g., an aqueous sulfuric acid solution).

Figure 2:
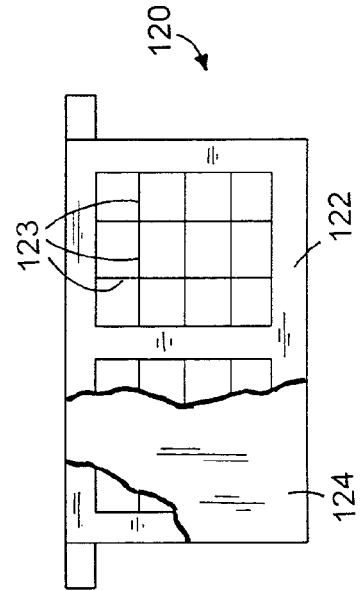
FIG. 2 is a partial cross-sectional view of an embodiment of an anode plate for a lead acid battery.
Figure 3:
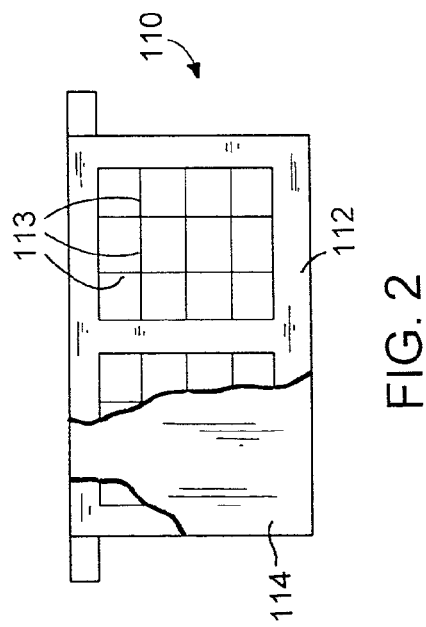
FIG. 3 is a partial cross-sectional view of an embodiment of a cathode plate for a lead acid battery.

FIGS. 2 and 3 are partial cross-sectional views of anode and cathode plates 110 and 120, respectively. Anode plate 110 includes a support 112 with a grid 113 having an anode composition 114 disposed thereon, and cathode plate 120 includes a support 122 with a grid 123 having a cathode composition 124 disposed thereon.

Anode composition 114 and/or cathode composition 124 can include glass fibers having an average length of from 0.1 millimeter to 1.5 millimeters. A fiber refers to an entity having a ratio of length to diameter (i.e., aspect ratio) of at least two.

Without wishing to be bound by theory, it is believed that including the glass fibers in anode composition 114 and/or cathode composition 124 can enhance the performance (e.g., enhance the initial specific capacity) of battery 100. It is believed that the glass fibers can increase the ability of the sulfuric acid to access the active electrode material in battery 100 because the fibers can extend from the interior of the electrode material into the sulfuric acid solution to form a pathway for one or more reactant participants (e.g., sulfuric acid) to penetrate the interior of the electrode material, thereby increasing the amount of the electrode material that can readily participate in the chemical reaction(s) of battery 100. It is further believed that the glass fibers can increase the mobility of ions with respect to their ability to get into and out of the electrode material (e.g., by providing a hydrophilic route for ion transmission), which can enhance the rate at which energy can be withdrawn from battery 100. It is also believed that the glass fibers can reduce the size and/or formation of domains of relatively inactive material (e.g., $PbSO_4$) present at the surface of anode composition 114 and/or cathode composition 124, which can also increase the amount of electrode material that can readily participate in the chemical reaction(s) of battery 100. It is further believed that the glass fibers can exhibit good electrical conductivity along their length when wet (e.g., when in contact with an aqueous sulfuric acid solution) so that the glass fibers do not a have a substantial undesirable impact on the electrical conductivity of the electrode material, and can actually enhance the conductivity of the electrode material in some embodiments. It is also believed that some glass fibers are capable of releasing certain ions (e.g., nickel, platinum, barium, cobalt, antimony, bismuth and/or tin) which are believed to be capable of enhancing battery performance when present in the sulfuric acid solution. It is believed that one or more of these features can be particularly advantageous, for example, when the battery is used in high discharge rate conditions.

Generally, the glass fibers are formed of one or more siliceous materials. While various types of glass fibers can be used, typically the glass fibers typically are relatively inert to lead acid battery storage and use conditions. In some embodiments, at least some (e.g., all) of the glass fibers contain a relatively small amount (e.g., less than one weight percent, less than 0.5 weight percent, less than 0.1 weight percent) of barium and/or zinc compounds (e.g., barium oxide, zinc oxide). In certain embodiments, at least some (e.g., all) of the glass fibers are formed of a type of glass commonly referred to as C glass.

Glass fibers are commercially available from, for example, Owens Corning (Toledo, Ohio), Johns Manville (Denver, Colo.), PPG (Pittsburgh, Pa.), Nippon Sheet Glass (Tokyo, Japan), Evanite Fiber Corporation (Corvallis, Oreg.), and Hollingsworth & Vose Company (East Walpole, Mass.). Examples of commercially available glass fibers include PA-01 glass fibers (Hollingsworth & Vose), PA-10 glass fibers (Hollingsworth & Vose Company), PA-20 glass fibers (Hollingsworth & Vose Company), Evanite 408 glass fibers (Evanite Fiber Company), Evanite 609 glass fibers (Evanite Fiber Company), Evanite 610 MB glass fibers (Evanite Fiber Company) and Evanite 719 glass fibers (Evanite Fiber Company).

In general, the glass fibers have an average length of less than 1.5 millimeters (e.g., less than 1.4 millimeters, less than 1.3 millimeters, less than 1.2 millimeters, less than 1.1 millimeters, less than one millimeter, less than 0.975 millimeter, less than 0.950 millimeter, less than 0.925 millimeter, less than 0.900 millimeter, less than 0.875 millimeter, less than 0.850 millimeter, less than 0.825 millimeter, less than 0.800 millimeter, less than 0.775 millimeter, less than 0.750 millimeter, less than 0.725 millimeter, less than 0.700 millimeter, less than 0.675 millimeter, less than 0.650 millimeter, less than 0.625 millimeter, less than 0.600 millimeter, less than 0.575 millimeter, less than 0.550 millimeter, less than 0.525 millimeter, less than 0.500 millimeter, less than 0.475 millimeter, less than 0.450 millimeter, less than 0.425 millimeter, less than 0.400 millimeter, less than 0.375 millimeter, less than 0.350 millimeter, less than 0.325 millimeter, less than 0.300 millimeter, less than 0.275 millimeter, less than 0.250 millimeter, less than 0.225 millimeter, less than 0.200 millimeter, less than 0.175 millimeter, less than 0.150 millimeter, less than 0.125 millimeter, less than 0.100 millimeter) and/or an average length of at least 0.100 millimeter (e.g., at least 0.125 millimeter, at least 0.150 millimeter, at least 0.175 millimeter, at least 0.200 millimeter, at least 0.225 millimeter, at least 0.250 millimeter, at least 0.275 millimeter, at least 0.300 millimeter, at least 0.325 millimeter, at least 0.350 millimeter, at least 0.375 millimeter, at least 0.400 millimeter, at least 0.425 millimeter, at least 0.450 millimeter, at least 0.475 millimeter, at least 0.500 millimeter).

The average length of a sample of fibers is determined as follows. The fibers are placed on a slide and the fiber lengths are measured by visual inspection using a Leica DMLS microscope with a video camera (Meyer Instruments, Inc., Houston, Tex.) using a magnification of from 20× to 200×. The average length is then calculated as the arithmetic mean of the measured fibers lengths.

In certain embodiments, the ability of the glass fibers to be processed into a paste is increased as the average length of the fibers is decreased. It is believed that this is due to certain enhanced flow characteristics achieved by reducing the average length of the fibers. As an example, Table I shows the flow characteristics of glass fibers having different average lengths. The average length of the PA-10 was 359 microns, and the average length of the PA-20 was 154 microns. The data in Table I was measured by: placing a given weight of a sample of glass fibers on a mesh having a given size; shaking the sample for five minutes at 42 Hz using a Syntron shaker; and weighing the amount of the glass fibers that passed through the screen. This test is referred to herein as the shake test. As indicated in Table I, for a given mesh size, the ability of the glass fibers to pass through the screen increased as the average fiber length was decreased.

TABLE I

| Fibers | Mesh Size | Sample Wt | Wt Passed | % Sample Passed |
|---|---|---|---|---|
| PA-01 | 6 × 6 | 5.047 g | 0.002 g | 0.04 |
| PA-01 | 4 × 4 | 5.087 g | 0.005 g | 0.10 |
| PA-10 | 10 × 10 | 5.052 g | 0.091 g | 1.80 |
| PA-10 | 8 × 8 | 5.038 g | 0.759 g | 15.07 |
| PA-10 | 6 × 6 | 5.053 g | 4.161 g | 82.35 |
| PA-10 | 4 × 4 | 5.045 g | 4.243 g | 84.10 |
| PA-10 | 4 × 4 | 5.098 g | 4.558 g | 89.41 |
| PA-20 | 10 × 10 | 5.098 g | 3.777 g | 74.09 |
| PA-20 | 8 × 8 | 5.053 g | 4.538 g | 89.81 |
| PA-20 | 6 × 6 | 5.045 g | 4.307 g | 85.37 |

In certain embodiments, at least one weight percent (e.g., at least two weight percent, at least five weight percent, at least 10 weight percent, at least 15 weight percent, at least 20 weight percent, at least 30 weight percent, at least 40 weight percent, at least 50 weight percent, at least 60 weight percent, at least 70 weight percent) of the glass fibers pass through a 10×10 mesh during the shake test.

In some embodiments, at least five weight percent (e.g., at least 10 weight percent, at least 15 weight percent, at least 20 weight percent, at least 30 weight percent, at least 40 weight percent, at least 50 weight percent, at least 60 weight percent, at least 70 weight percent, at least 80 weight percent, at least 90 weight percent) of the glass fibers pass through an 8×8 mesh during the shake test.

In certain embodiments, at least five weight percent (e.g., at least 10 weight percent, at least 15 weight percent, at least 20 weight percent, at least 30 weight percent, at least 40 weight percent, at least 50 weight percent, at least 60 weight percent, at least 70 weight percent, at least 80 weight percent, at least 90 weight percent) of the glass fibers pass through a 6×6 mesh during the shake test.

In certain embodiments, at least five weight percent (e.g., at least 10 weight percent, at least 15 weight percent, at least 20 weight percent, at least 30 weight percent, at least 40 weight percent, at least 50 weight percent, at least 60 weight percent, at least 70 weight percent, at least 80 weight percent, at least 90 weight percent) of the glass fibers pass through a 4×4 mesh during the shake test.

In some embodiments, more than six weight percent (e.g., at least seven weight percent, at least eight weight percent, at least nine weight percent, at least 10 weight percent, at least 11 weight percent, at least 12 weight percent, at least 13 weight percent at least 14 weight percent) of an association of the glass fibers is lost during the hand sheet test. The hand sheet test is performed as follows. An association of fibers is placed in a Hamilton Beach seven speed blender, and 550 milliliters of deionized (reverse osmosis) water is added to the blender. An amount of aqueous sulfuric acid (22 volume percent sulfuric acid) is added to the blender so that the mixture obtain a pH of 2.8. The blender is set to high and blended for 10 seconds. The blended mixture is poured into a TAPPI semiautomatic hand sheet mold with a 150 mesh screen, and the mold is turned on so that the blended mixture is formed into a hand sheet on the 150 mesh screen. The mold is then turned off, and the hand sheet is couched from the 150 mesh screen using 6.5 pounds per square inch pressure. The hand sheet is rolled five times using a 25 pound roller, and then put in an oven at 187° C. until dry. The mass of the dried hand sheet is then measured. The percent weight loss is the ratio of the mass of the dried hand sheet to the initial mass of the association of fibers.

The glass fibers can have an average diameter of less than 40 microns (e.g., less than 35 microns, less than 30 microns, less than 25 microns, less than 20 microns, less than 15 microns, less than 10 microns, less than five microns, less than three microns, less than 2.9 microns, less than 2.75 microns, less than 2.5 microns, less than 2.25 microns, less than 2.5 microns, less than 2.25 microns, less than two microns, less than 1.75 microns, less than 1.5 microns, less than 1.25 microns, less than one micron) and/or an average diameter of at least one micron (e.g., at least 1.25 microns, at least 1.5 microns, at least 1.75 microns, at least two microns, at least 2.25 microns, at least 2.5 microns, at least 2.75 microns, at least three microns, at least 3.5 microns, at least four microns). In certain embodiments, the glass fibers have an average diameter of from 0.7 microns to 6.25 microns (e.g., 0.9 microns, 1.35 microns, 2.9 microns, 2.8 microns, 6.1 microns).

The average diameter of a sample of fibers is determined using the BET method and argon gas.

The glass fibers can have an average aspect ratio of less than 1,500 (e.g., less than 1400, less than 1,300, less than 1,200, less than 1,100, less than 1,000, less than less than 900, less than 800, less than 700, less than 600, less than 500, less than 400, less than 300) and/or an average aspect ratio of at least two (e.g., at least five, at least 10, at least 50, at least 60, at least 70, at least 80, at least 90, at least 100, at least 110, at least 120, least 130, at least 140, at least 150, at least 160, at least 170, at least 180, at least 190, at least 200, at least 250, at least 300, at least 350, at least 400).

The average aspect ratio of a sample of fibers refers to the ratio of the average length of the sample of fibers to the average diameter of the sample of fibers.

In certain embodiments, the glass fibers can have a relatively low acid absorption. For example, the glass fibers can have an acid absorption of less than 1,350% (e.g., less than 1,300%, less than 1,250%, less than 1,200%, less than 1,150%, less than 1,100%, less than 1,500%, less than 1,000%, less than 950%, less than 900%, less than 850%, less than 800%, less than 750%, less than 700%, less than 650%, less than 600%, less than 550%, less than 500%, less than 450%, less than 400%, less than 350%, less than 300%, less than 250%, less than 200%, less than 150%, less than 125%, less than 100%) and/or at least 50% (e.g., at least 100%, at least 150%, at least 200%, at least 250%, at least 300%, at least 350%).

The acid absorption of a sample of fibers is measured as follows. One gram of the sample of fibers is placed in a dish (e.g., a petri dish). An amount of 1.28 specific gravity sulfuric acid sufficient to wet and cover the fibers is placed on the fibers. The fibers are soaked in the sulfuric acid for five minutes. The fibers are removed from the sulfuric acid, placed on a screen and drained for one minute. The mass of the fibers is then measured to determine the wet mass of the fibers. The acid absorption is determined by the following equation.

Acid absorption=((wet mass of fibers in grams−one gram)/(one gram))*(100%))

At least some of the glass fibers can be substantially noncoated. A substantially noncoated fiber means a fiber which, prior to being incorporated into anode material 114 or cathode material 124, has a coating (e.g., a metal coating, a metal oxide coating, an alloy coating) on less than 90 percent (e.g., less than 80 percent, less than 70 percent, less than 60 percent, less than 50 percent, less than 40 percent, less than 30 percent, less than 20 percent, less than 10 percent, less than five percent, less than four percent, less than three percent, less than two percent, less than one percent) of its surface.

At least some of the glass fibers can be substantially nonhollow. A substantially nonhollow fiber, as referred to herein, means a fiber which has an internal volume that is at least 10 percent (e.g., at least 20 percent, at least 30 percent, at least 40 percent, at least 50 percent, at least 60 percent, at least 70 percent, at least 80 percent, at least 90 percent, at least 95 percent, at least 96 percent, at least 97 percent, at least 98 percent, at least 99 percent) solid.

At least some of the glass fibers can be substantially nonporous. A substantially nonporous fiber, as referred to herein, means a fiber which has a surface with less than 95 percent (e.g., less than 90 percent, less than 80, less than 70 percent, less than 60 percent, less than 50 percent, less than 40 percent, less than 30 percent, less than 10 percent) formed of pores.

In general, the amount of the glass fibers included in anode material 114 and/or cathode material 124 can be varied as desired. For example, anode material 114 and/or cathode material 124 can include at least 0.02 weight percent (e.g., at least 0.05 weight percent, at least 0.1 weight percent, at least 0.2 weight percent, at least 0.3 weight percent, at least 0.4 weight percent, at least 0.5 weight percent, at least 0.6 weight percent, at least 0.7 weight percent, at least 0.8 weight percent, at least 0.9 weight percent, at least one weight percent, at least 1.1 weight percent, at least 1.2 weight percent, at least 1.3 weight percent, at least 1.5 weight percent, at least 1.6 weight percent, at least 1.7 weight percent, at least 1.8 weight percent, at least 1.9 weight percent, at least two weight percent) and/or less than 20 weight percent (e.g., less than 15 weight percent, less than 10 weight percent, less than five weight percent, less than four weight percent, less than three weight percent, less than 2.75 weight percent, less than 2.5 weight percent, less than 2.25 weight percent, less than two weight percent, less than 1.75 weight percent, less than 1.5 weight percent) of the glass fibers relative to the amount the lead in the material (for anode material 114) or lead dioxide in the material (for cathode material 124).

Glass fibers having an average length of from 0.1 millimeter to 1.5 millimeter can be formed using various techniques. Typically, the glass fibers are formed by reducing the average length of relatively long fibers. The relatively long fibers can have an average length of, for example, at least five millimeters (e.g., at least 7 millimeters, at least 10 millimeters, at least 15 millimeters, at least 20 millimeters).

In certain embodiments, glass fibers having an average length of from 0.1 millimeter to 1.5 millimeters are prepared by crushing longer fibers. For example, a bale of the glass fibers can be put into a container, and a pressure (e.g., at least 50 pounds per square inch, at least 75 pounds per square inch, at least 100 pounds per square inch, at least 125 pounds per square inch, at least 150 pounds per square inch, at least 175 pounds per square inch, at least 200 pounds per square inch) can be applied to the fibers to crush the fibers for a certain period time (e.g., at least one second, at least two seconds, at least three seconds, at least four seconds, at least five seconds, at least six seconds, at least seven seconds, at least eight seconds, at least nine seconds, at least 10 seconds). The crushing step can be repeated as many times as desired (e.g., one time, two times, three times, four times, five times, six times, seven times, eight times, nine times, 10 times, 11 times, 12 times) until the fibers have the desired average length. In certain embodiments, the bale can be rotated through an angle (e.g., five degrees, 10 degrees, 20 degrees, 30 degrees, 40 degrees, 50 degrees, 60 degrees, 70 degrees, 80 degrees, 90 degrees) between one or more of the crushing steps (e.g., between each crushing step, between every other crushing step).

In some embodiments, the ratio of the average length of an association of glass fibers before crushing to the average length of the association of glass fibers after crushing can be at least 15 (e.g., at least 20, at least 25, at least 30, at least 35, at least 40, at least 45, at least 50, at least 75, at least 100, at least 200, at least 250) and/or less than 500 (e.g., less than 250, less than 200).

Figure 4:
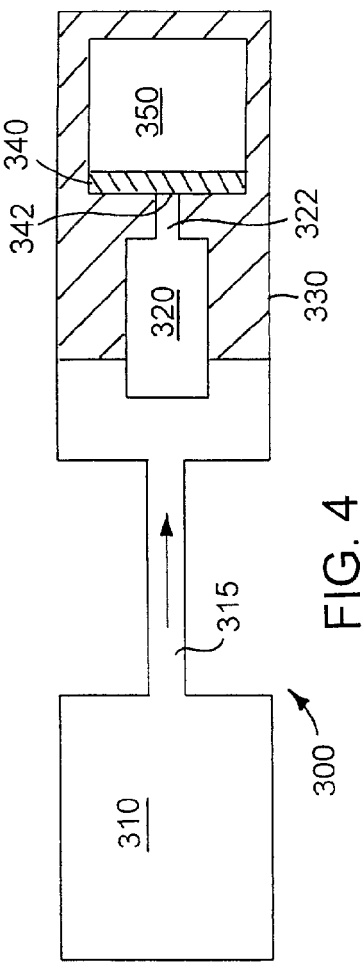
FIG. 4 is a cross-sectional view of an embodiment of an apparatus for modifying the average length of an association of fibers.

FIG. 4 is a cross-sectional view of an apparatus 300 for forming the glass fibers. Apparatus has a compressor (e.g., a hydraulic compressor) 310 that exerts a pressure (e.g., at least 500 pounds per square inch, at least 1,000 pounds per square inch, at least 1,500 pounds per square inch, at least 1,750 pounds per square inch). Compressor 310 is in fluid communication with a cylinder (e.g., a hydraulic cylinder) 320 via a conduit 315. Cylinder 320 is disposed within a housing 330 and includes a ram 322 that is used to transfer the pressure from cylinder 320 to a portion of a surface 342 of a platen 340. Platen 340, in turn, exerts a pressure against the contents (e.g., a bale of glass fibers) disposed within an opening 350 in housing 330. Typically, the platen 340, ram 322 and cylinder 320 are configured so that the pressure exerted by platen 340 against the contents of opening 350 is less than the pressure exerted by compressor 310 against cylinder wall 322. For example, the pressure exerted by platen 340 against the contents of opening 350 can be less than 90% (e.g., less than 80%, less than 70%, less than 60%, less than 50%, less than 40%, less than 30%, less than 20%, less than 10%) of the pressure exerted by compressor 310 along cylinder wall 322.

During use of system 300, a bale of glass fibers is disposed in opening 350; ram 322 exerts a pressure against platen surface 342; and the pressure from platen 340 is exerted against the glass fibers in opening 350 for a given period of time. In certain embodiments, this step is repeated with or without rotation of the bale between steps of applying pressure to the bale. In embodiments in which the step of applying pressure is repeated, the pressures used can be varied for different pressure application steps, or they can be substantially the same in each pressure application step.

Anode material 114 and/or cathode material 124 can include additional materials, such as conventional lead acid battery electrode additives. For example, anode material 114 and/or cathode material 124 can include one or more reinforcing materials, such as chopped organic fibers (e.g., having an average length of 0.125 inch or more). Other materials that can be contained in anode material 114 and/or cathode material 124 include metal sulfate(s) (e.g., nickel sulfate, copper sulfate), red lead (e.g., a $Pb_3O_4$-containing material), litharge, paraffin oil, and/or expander(s). Generally, an expander contains barium sulfate, carbon black and lignin sulfonate as the primary components. The components of the expander(s) can be pre-mixed or non pre-mixed. Expanders are commercially available from, for example, Hammond Lead Products (Hammond, Ind.) and Atomized Products Group, Inc (Garland, Tex.). An example of a commercially available expander is Texex® expander (Atomized Products Group, Inc., Garland, Tex.). In certain embodiments, the expander(s), metal sulfate(s) and/or paraffin are present in anode material 114, but not cathode material 124.

In general, an electrode material is prepared by mixing lead oxide (e.g., lead oxide formed a ball mill process and/or lead oxide formed by the Barton process) and other electrode material components to form a paste, applying the paste to a support (e.g., a lead grid) to make a plate, partially drying the pasted material, curing the material, drying the cured material, forming the material (e.g., converting the lead oxide to lead for anode material 114 and converting the lead oxide to lead dioxide for cathode material 124), and assembling the plates into a battery configuration.

Generally, the order of combining the components can be varied as desired. Typically, the components are added sequentially while stirring.

In certain embodiments, the paste is prepared as follows. Lead oxide, the glass fibers, water and additional components are combined in a mixer (e.g., sequentially or simultaneously), and mixed for a period of time (e.g., from one minute to 10 minutes). Sulfuric acid (e.g., 50 weight percent aqueous sulfuric acid) is added to the mixture, and mixed. In general, the sulfuric acid is added at a controlled rate to prevent the mixture from overheating, and mixing occurs while adding the sulfuric acid. For example, the sulfuric acid can be added at a rate so that the maximum temperature achieved by the mixture during the addition of the sulfuric acid is less than 70° C. (e.g., from 55° C. to 65° C.). After adding the sulfuric acid, the mixture is mixed and cooled to less than 40° C. (e.g., from 30° C. to 35° C.) to form the paste.

In some embodiments, the paste is prepared as follows. The glass fibers, water and additional components (other than lead oxide) are combined in a mixer (e.g., sequentially or simultaneously), and mixed for a period of time (e.g., from one minute to 10 minutes). The lead oxide is added to the mixture, and mixed for a period of time (e.g., from one minute to 10 minutes). Sulfuric acid (e.g., 50 weight percent aqueous sulfuric acid) is added to the mixture, and mixed. In general, the sulfuric acid is added at a controlled rate to prevent the mixture from overheating, and mixing occurs while adding the sulfuric acid. For example, the sulfuric acid can be added at a rate so that the maximum temperature achieved by the mixture during the addition of the sulfuric acid is less than 70° C. (e.g., from 55° C. to 65° C.). The mixture is then cooled to less than 40° C. (e.g., from 30° C. to 35° C.) with mixing to form the paste.

Without wishing to be bound by theory, it is believed that the glass fibers are capable of adsorbing water, and that including glass fibers in the paste composition can result in a paste that has a relatively high water content while having a relatively low cube weight.

The paste is then applied to the support. This can be done using standard techniques.

Figure 5:
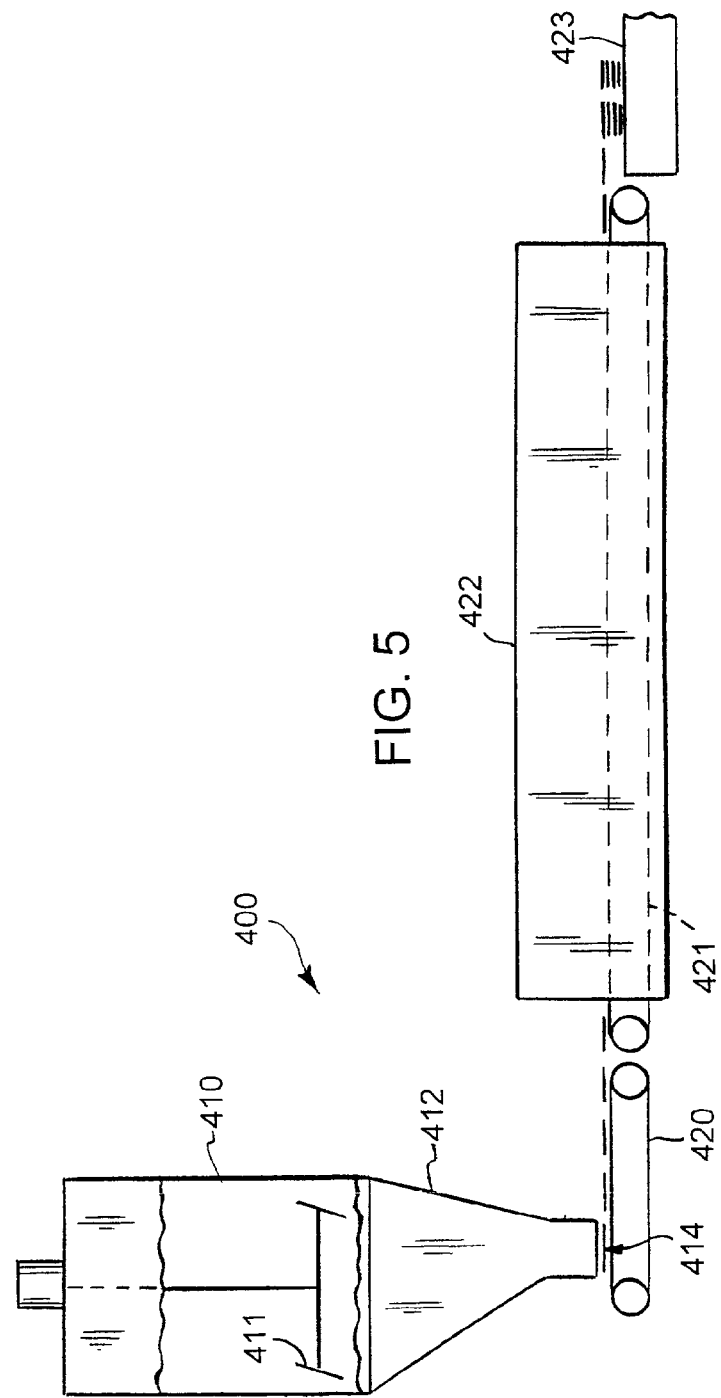
FIG. 5 is an illustration of an embodiment of a pasting apparatus.

FIG. 5 is an illustration of an embodiment of a pasting apparatus 400 that can be used to apply a paste to a support and to partially dry the material. Apparatus 400 includes a mixer 410 with a mixing blade 411 and a paste hopper 412 that contains the paste. The paste exits hopper 412 and is disposed on a support 414 located on a conveyor 420. The pasted support moves along a conveyor 421 and enters an oven 422, where the paste is heated to reduce its water content (e.g., to less than 10 weight percent water, such as from seven weight percent to nine weight percent water). Typically, the temperature in oven 422 is from 150° C. to 345° C., and each pasted support spends from fifteen seconds to a minute in oven 422. After exiting oven 422, the plates are stacked on a table 423.

Figure 6:
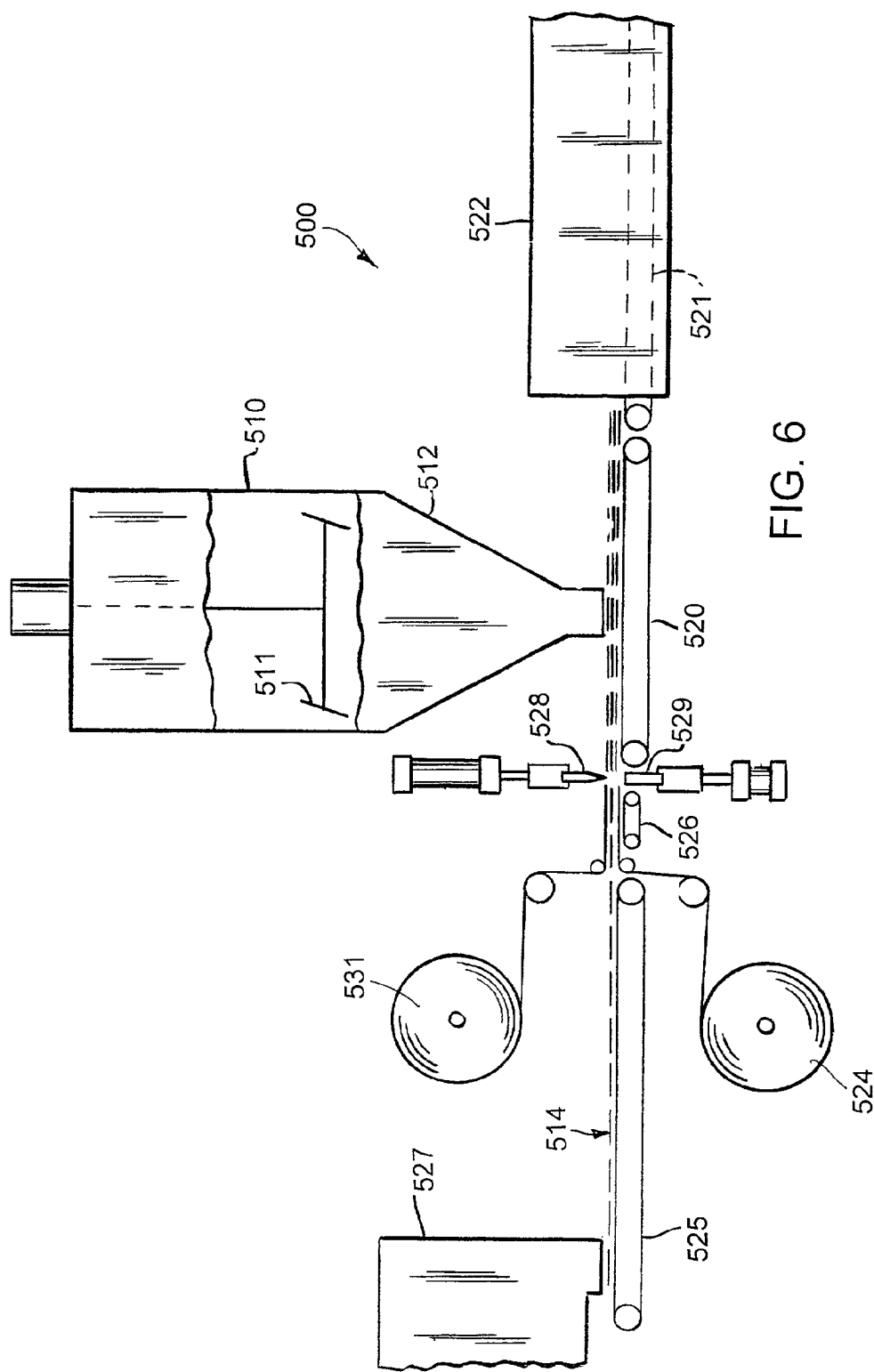
FIG. 6 is an illustration of an embodiment of a pasting apparatus.

FIG. 6 is an illustration of an embodiment of a pasting apparatus 500 that can be used to apply a paste to a support and to partially dry the material. Apparatus 500 includes a mixer 510 with a mixing blade 511 and a paste hopper 512 that contains the paste. Apparatus 500 also includes a support feeing station 527, a conveyor 525 and pasting paper rolls 524 and 531. Supports 514 move from support feeding station 527 along conveyor 525, are covered by pasting paper from rolls 524 and 531 and move along a conveyor 526. A knife 528 and an anvil 529 are used to cut the pasting paper between adjacent supports, and the supports then move along a conveyor 520. As the supports pass under hopper 512, the paste exits hopper 512 and is disposed on the supports. The pasted supports move along conveyors 520 and 521 and enter an oven 522, where the paste is heated to reduce its water content (e.g., to less than 10 weight percent water, such as from seven weight percent to nine weigh percent water). Typically, the temperature in oven 522 is from 150° C. to 345° C., and each pasted support spends from fifteen seconds to a minute in oven 522. After exiting oven 522, the plates are stacked on a table.

The plates are then cured. In general, the curing process can be used to reduce the amount of lead present in the lead oxide particles present in the material disposed on the supports (e.g., to a lead content of less than four weight percent relative to the lead oxide, such as less than one weight percent lead relative to the lead oxide). The curing process can also be used to further reduce the water content of the material disposed on the supports. In certain embodiments, the plates are cured at relatively high humidity (e.g., at least 90 percent humidity, such as at least 95 percent humidity) and relatively high temperature (e.g., at least 35° C., such as from 35° C. to 50° C.) for a period of time (e.g., at least one day, such as from one day to seven days). In some embodiments, the plates are cured at relatively low humidity (e.g., less than five percent humidity, such as less than one percent humidity) and relatively high temperature (e.g., at least 35° C., such as from 35° C. to 50° C.) for a period of time (e.g., less than three days, such as less than two days). In some embodiments, curing is achieved by covering the plates and placing the covered plates in a controlled environment for a period of time (e.g., from three to five days).

Without wishing to be bound by theory, it is believed that the presence of the glass fibers in the electrode material(s) can reduce the amount of time used to cure the material. In particular, it is believed that the glass fibers are capable of adsorbing water, which is believed to act as a catalyst in the oxidation of lead, and that the water contained in the glass fibers can increase the rate of lead oxidation, thereby reducing the cure time used to obtain a desired degree of lead oxidation (e.g., as measured by the weight percent of lead relative to lead oxide). Moreover, it is believed that plates with the cured material having glass fibers can have a relatively high water content without sticking to other plates, as compared to substantially similar plates having cured material without the glass fibers.

The cured plates are formed to convert the lead oxide to lead (for anode material 114) or lead dioxide (for cathode material 124). Typically, this is done using standard electroforming processes. For example, forming can involve putting the plates and sulfuric acid in a container, and electrochemically charging the plates at appropriate potentials to convert the lead oxide to the electrode material.

After forming, the plates are removed from the container and dried. Usually, the anode plates are dried in a relatively inert atmosphere to reduce the likelihood of lead oxidation.

The dried plates are assembled into a battery using standard techniques. Typically, this includes disposing a separator between adjacent plates within a container, electrically connecting the plates (e.g., with a lead bridge) to form cells (e.g., single cells and/or series cells), and inserting the sulfuric acid into the container. Often, a DC current is passed through the cells (e.g., 500 Ampere-hours per kilogram) while the temperature of the battery is maintained below 60° C.

The following examples are illustrative only and not intended as limiting. During paste prepartion, an Oxmaster mixer (Oxmaster, Inc., located in Austel, Ga.) was used, and the mixing rate was 85 revolutions per minute. The cube weight of a paste was determined by adding an amount of the paste to fill a cup, and then calculating the density of the paste in the volume of the cup. The penetration of a paste was determined by dropping a cylindrical metal object with a point (length of six inches) from a height of six inches above the paste, and measuring the distance (inches) into the paste the object traveled. The water ratio of a paste is the ratio of the amount of water in the paste to the amount of lead oxide originally added to the mixer. The acid ratio of a paste is to the ratio of the amount of acid in the paste to the amount of lead oxide originally added to the mixer.

EXAMPLE 1

50 pounds of glass fibers were prepared as follows.

50 pounds of PA-01 glass fibers (Hollingsworth & Vose Company) were formed into a bale. The bale was put into an apparatus as described above (1800 pounds per square inch exerted by compressor, eight inch diameter hydraulic cylinder, four inch diameter ram, 19 inch by 25 inch platen), and a pressure of 190 pounds per square inch was applied to the fibers for five seconds. The pressure was removed, and the bale was rotated 90 degrees. A pressure of 190 pounds per square inch was again applied to the fibers for five seconds. The resulting glass fibers had an average length of 359 microns and an acid absorption of 1,097%. Five samples of the resulting glass fibers had an average weight loss of 13.85% according to the hand sheet test, whereas five samples of PA-01 glass fibers had an average weight loss of 5.15% according to the hand sheet test.

EXAMPLE 2

50 pounds of glass fibers were prepared according to the method described in Example 1, except that the steps of applying a pressure of 190 pounds per square inch for five seconds and rotating the fiber 90 degrees between presses was repeated a total of six times. The resulting glass fibers had an average length of 183 microns and an acid absorption of 292%.

EXAMPLE 3

50 pounds of glass fibers were prepared according to the method described in Example 1, except that the steps of applying a pressure of 190 pounds per square inch for five seconds and rotating the fiber 90 degrees between presses was repeated a total of nine times. The resulting glass fibers had an average length of 154 microns and an acid absorption of 177%.

EXAMPLE 4

50 pounds of glass fibers were prepared according to the method described in Example 1, except that: 1.) Evanite 408 glass fibers (Evanite Fiber Corporation), having an average fiber length of 387 microns and an average fiber diameter of 0.87 microns, were used; and 2.) that the steps of applying a pressure of 190 pounds per square inch for five seconds and rotating the fiber 90 degrees between presses was repeated a total of three times. The resulting fibers had an average length of 150 microns and an acid absorption of 1,845%.

EXAMPLE 5

50 pounds of glass fibers were prepared according to the method described in Example 4, except that the steps of applying a pressure of 190 pounds per square inch for five seconds and rotating the fiber 90 degrees between presses was repeated a total of six times. The resulting fibers had an average length of 132 microns and acid absorption of 1,577%.

EXAMPLE 6

50 pounds of glass fibers were prepared according to the method described in Example 4, except that the steps of applying a pressure of 190 pounds per square inch for five seconds and rotating the fiber 90 degrees between presses was repeated a total of nine times. The resulting fibers had an average length of 112 microns and an acid absorption of 1,091%.

EXAMPLE 7

50 pounds of glass fibers were prepared according to the method described in Example 4, except that the steps of applying a pressure of 190 pounds per square inch for five seconds and rotating the fiber 90 degrees between presses was repeated a total of 12 times. The resulting fibers had an average length of 115 microns and an acid absorption of 742%.

EXAMPLE 8

50 pounds of glass fibers were prepared according to the method described in Example 1, except that: 1.) Evanite 609 glass fibers (Evanite Fiber Corporation), having an average fiber length of 258 microns and an average fiber diameter of 1.35 microns, were used; and 2.) that the steps of applying a pressure of 190 pounds per square inch for five seconds and rotating the fiber 90 degrees between presses was repeated a total of three times. The resulting fibers had an average length of 148 microns and an acid absorption of 1,274%.

EXAMPLE 9

50 pounds of glass fibers were prepared according to the method described in Example 8, except that the steps of applying a pressure of 190 pounds per square inch for five seconds and rotating the fiber 90 degrees between presses was repeated a total of six times. The resulting fibers had an average length of 125 microns and an acid absorption of 901%.

EXAMPLE 10

50 pounds of glass fibers were prepared according to the method described in Example 8, except that the steps of applying a pressure of 190 pounds per square inch for five seconds and rotating the fiber 90 degrees between presses was repeated a total of nine times. The resulting fibers had an average length of 108 microns and an acid absorption of 665%.

EXAMPLE 11

Glass fibers were prepared according to the method described in Example 8, except that the steps of applying a pressure of 1800 pounds per square inch for five seconds and rotating the fiber 90 degrees between presses was repeated a total of 12 times. The resulting fibers had an average length of 102 microns and an acid absorption of 430%.

EXAMPLE 12

Anode plates for a group 31 lead acid battery (12 Volts, 750 cold crank Amps, and 180 minutes of reserved capacity) were prepared as follows.

2400 pounds of lead oxide (prepared using the Barton process), 0.75 pounds of Dynel flock (available from Cellusuede Products, Inc., located in Madison, Wis.), 12 pounds of Texex® expander (Atomized Products Group, Inc.) and 132 kilograms of water were sequentially added to the Oxmaster mixer while mixing. This combination was subsequently mixed for two minutes. 135 kilograms of aqueous sulfuric acid (specific gravity of 1.40) were was added, and the resulting combination was mixed until it reached a temperature of 45° C.

The resulting paste had a maximum temperature during preparation of 65° C., a cube weight of 70 grams per cubic inch, a water ratio of 0.133, and an acid ratio of 0.095.

The paste was belt pasted onto grids using a flash dry oven with the following parameters: the rate was 150 plates pasted per minute, the oven temperature was 420° F., the moisture in the oven was 7.1%, the plate weight was 155 grams, the grids weighed 66 grams each, and the plate count was 6000.

Two sample pasted plates were tested for porosity using the mercury intrusion method. The two pasted plates had an average total volume intrusion of 0.1211 cubic centimeters per gram (100%), an average macro pore volume of 0.0608 cubic centimeters per gram (50%), and an average micro pore volume of 0.0603 cubic centimeters per gram (50%).

The pasted plates were cured at a 90 percent humidity at 45° C. for three days.

The cured plates were dried for two days at 100° F.

A group 31 lead acid battery was prepared by stack assembling as follows. Alternating anode and cathode plates (cathode plates prepared as described above but without expander) were assembled with a separator disposed between adjacent electrodes. The plate/separator assembly was placed in a plastic battery container. The cover of the container was sealed, and the ports were burned. Sulfuric acid (specific gravity of 1.2) was added to the container, and the electrodes were charged at approximately 500 Amphours per kilogram for two days while maintaining the temperature below 60° C.

The assembly was then formed in a 25° C. water bath according to the schedule shown in Table II.

TABLE II

| Step | Amps | Amp-Hours | Hours |
|---|---|---|---|
| 1 | 6 | 6 | 1 |
| 2 | 17 | 14.5 | 8.5 |
| 3 | 0 | 0 | 2 |
| 4 | 12.2 | 73 | 5.5 |
| 5 | 9.3 | 133 | 14.6 |
| 6 | 5.5 | 44 | 8 |

Figure 7:
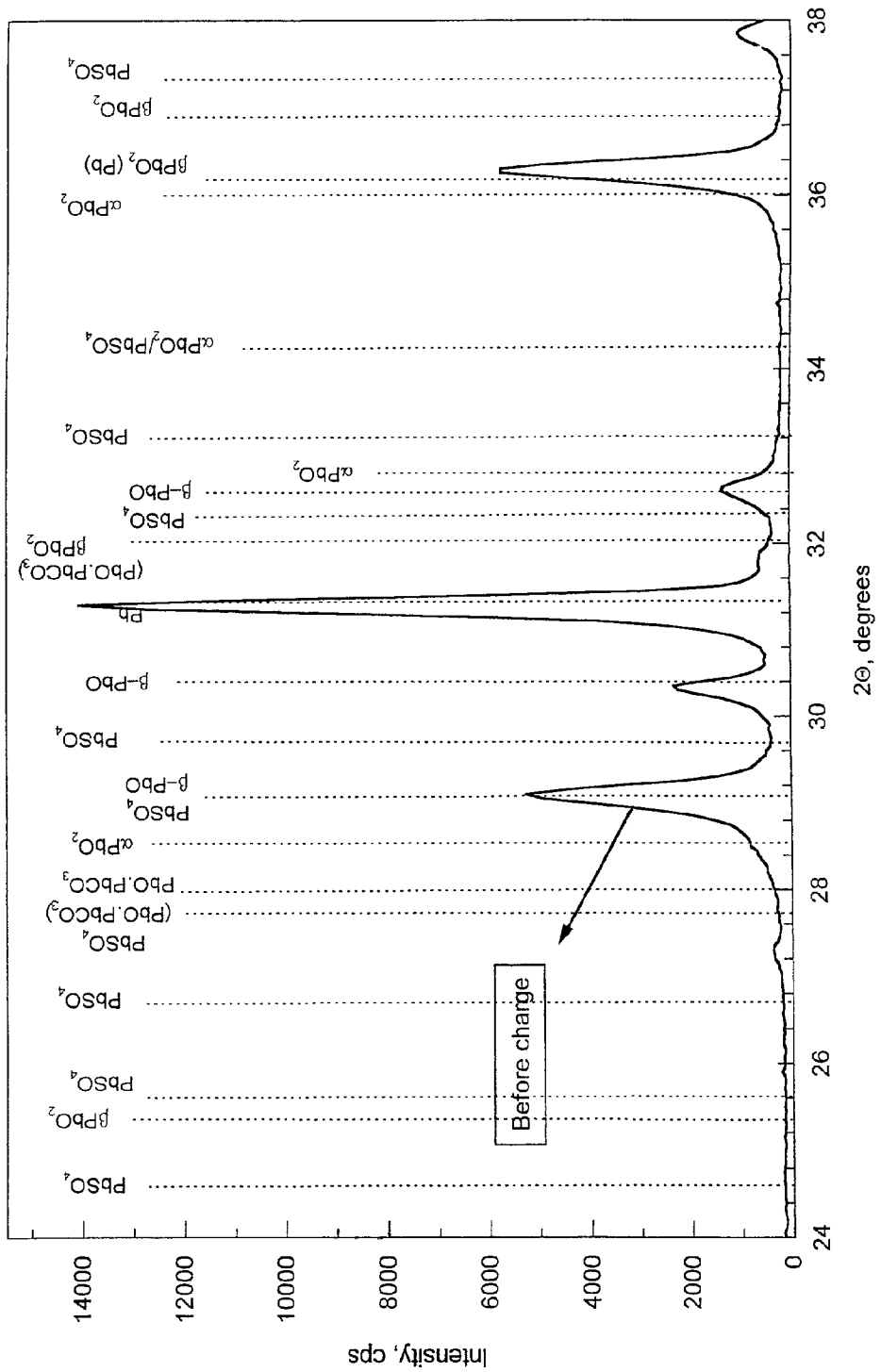
FIG. 7 is an X-ray diffraction scan of a discharged anode plate.
Figure 8:
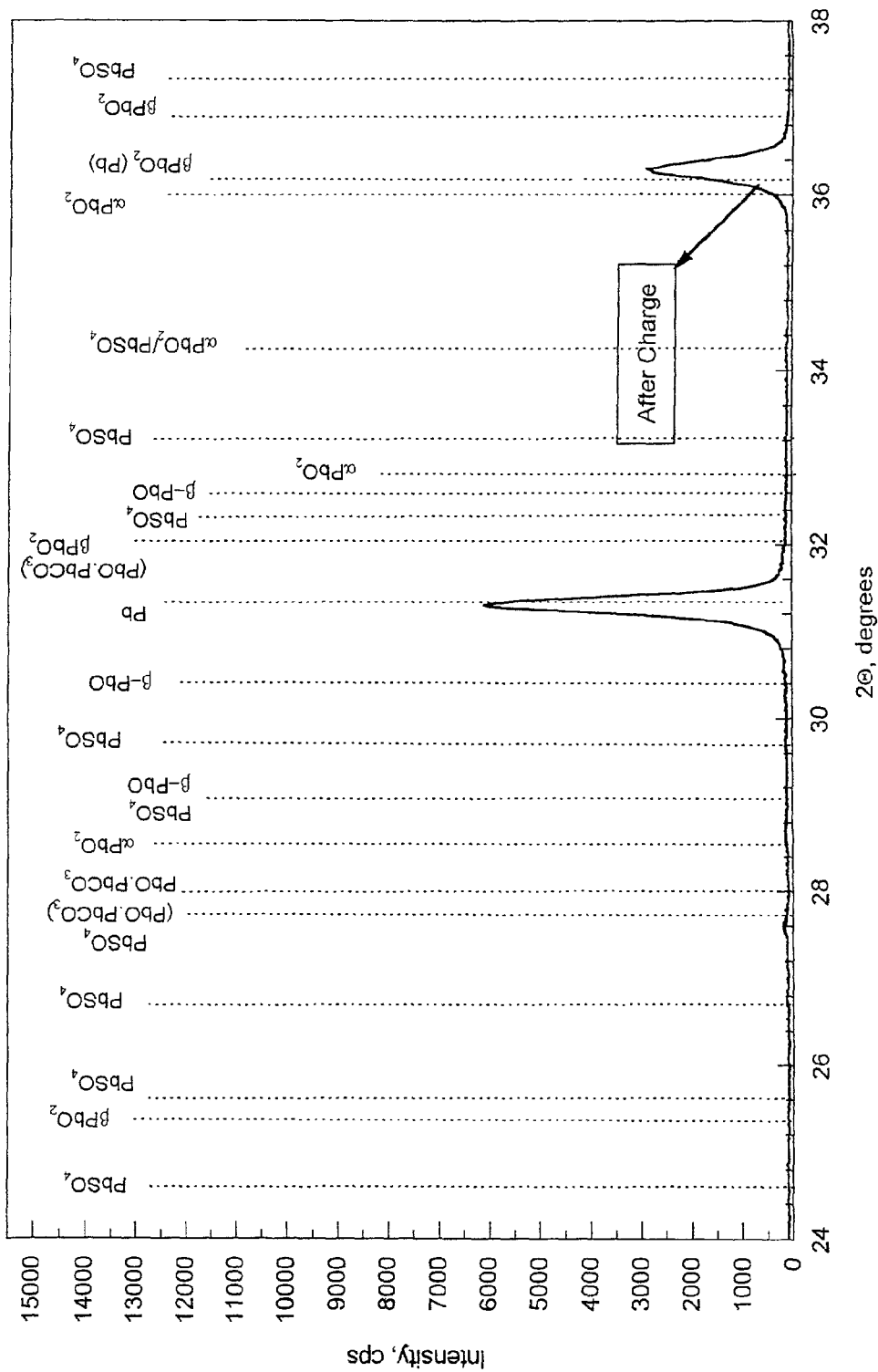
FIG. 8 is an X-ray diffraction scan of a charged anode plate.

FIGS. 7 and 8 are X-ray diffraction scans of a discharged and charged anode plate, respectively. The charged plate was exposed to atmospheric conditions for a period of time prior to taking the X-ray diffraction scan.

Figure 9:
FIG. 9 is a scanning electron micrograph of a discharged anode plate skeleton taken at 800× magnification.
Figure 10:
FIG. 10 is a scanning electron micrograph of a discharged anode plate skeleton taken at 3,000× magnification.
Figure 11:
FIG. 11 is a scanning electron micrograph of a discharged anode plate skeleton taken at 3,000× magnification.

The pure lead component of the negative active material was isolated from the discharged negative plates by dissolution. FIGS. 9–11 are scanning electron micrographs of the discharged, isolated negative active material taken at 800×, 3,000× and 3,000× magnification, respectively.

EXAMPLE 13

Anode plates for a group 31 lead acid battery (12 Volts, 750 cold crank Amps, and 180 minutes of reserved capacity) were prepared as follows.

12.5 pounds of PA-01 glass fibers (Hollingsworth & Vose Company), four pounds of Texex® expander (Atomized Products Group, Inc.) and 46 kilograms of water were sequentially added to the Oxmaster mixer while mixing at 85 revolutions per minute. This combination was mixed for one minute. 850 pounds of lead oxide (prepared using the Barton process) were then added, and the combination was mixed for two minutes. 48 pounds of aqueous sulfuric acid (specific gravity 1.40) were added, and the resulting combination was mixed until it reached a temperature of 110° F.

The resulting paste had a cube weight of 71.5 grams per cubic inch, and a peak temperature of 130° F.

The paste was belt pasted onto grids using a flash dry oven with the following parameters: the rate was 150 plates pasted per minute, the oven temperature was 420° F., the moisture in the oven was 7.1%, the plate weight was 155 grams, the grids weighed 66 grams each, and the plate count was 6000.

Two sample pasted plates were tested for porosity using the mercury intrusion method. The two samples pasted plates had an average total volume intrusion of 0.1353 cubic centimeters per gram (100%), an average macro pore volume of 0.0657 cubic centimeters per gram (49%), and an average micro pore volume of 0.0697 cubic centimeters per gram (51%).

Comparison of the average mercury intrusion values measured for the sample pasted plates of Examples 12 and 13 shows that including the glass fibers in the paste resulted in an increase of more than 10% in porosity of the pasted plates, and a shift toward smaller pores.

Figure 12:
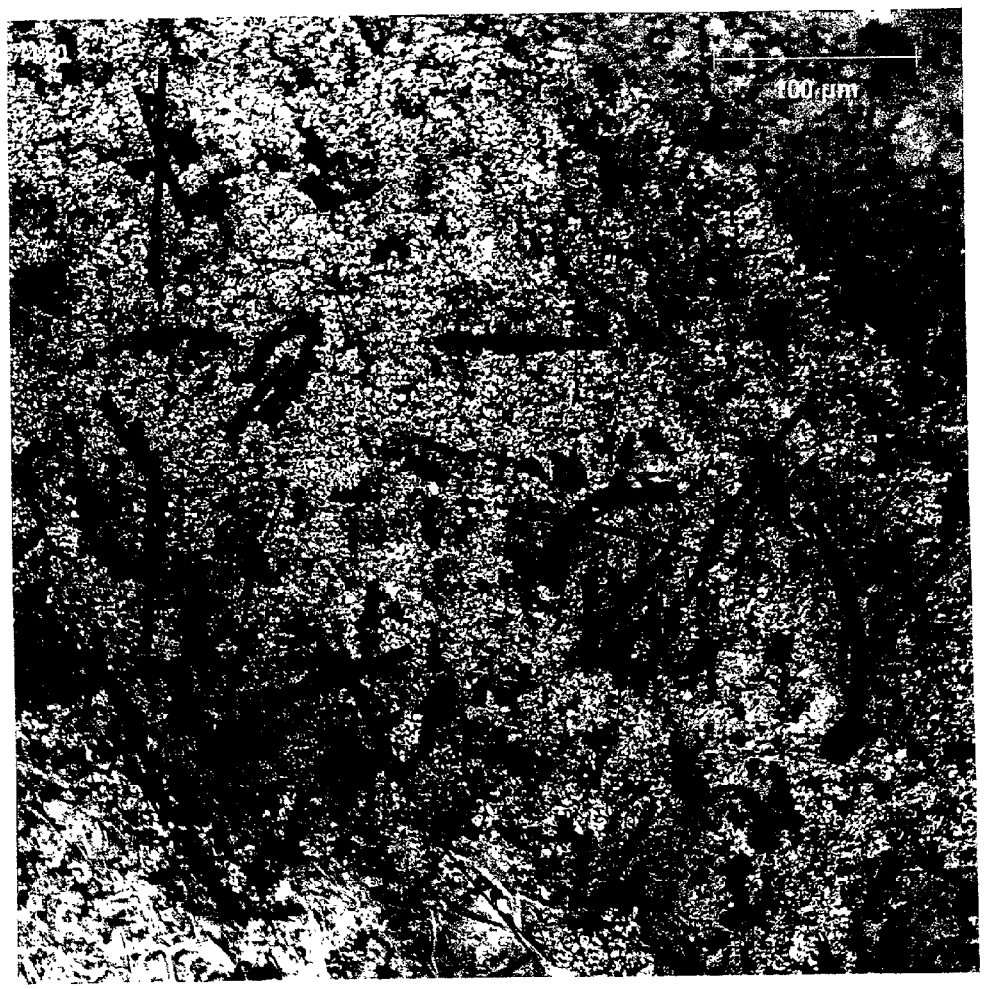
FIG. 12 is a scanning electron micrograph of a dried, pasted anode plate (before curing) taken at 500× magnification.

The pasted plates were dried as described in the preceding example. FIG. 12 is a scanning electron micrograph taken of a dried, pasted plate (before curing) taken at 500× magnification. The figure shows that the glass fibers extend from the interior of the paste to the exterior of the paste.

The dried, pasted plates were further processed to provide a lead acid battery using the processes described in the preceding example (cathode plates made using the paste of this example, but without expander).

Figure 13:
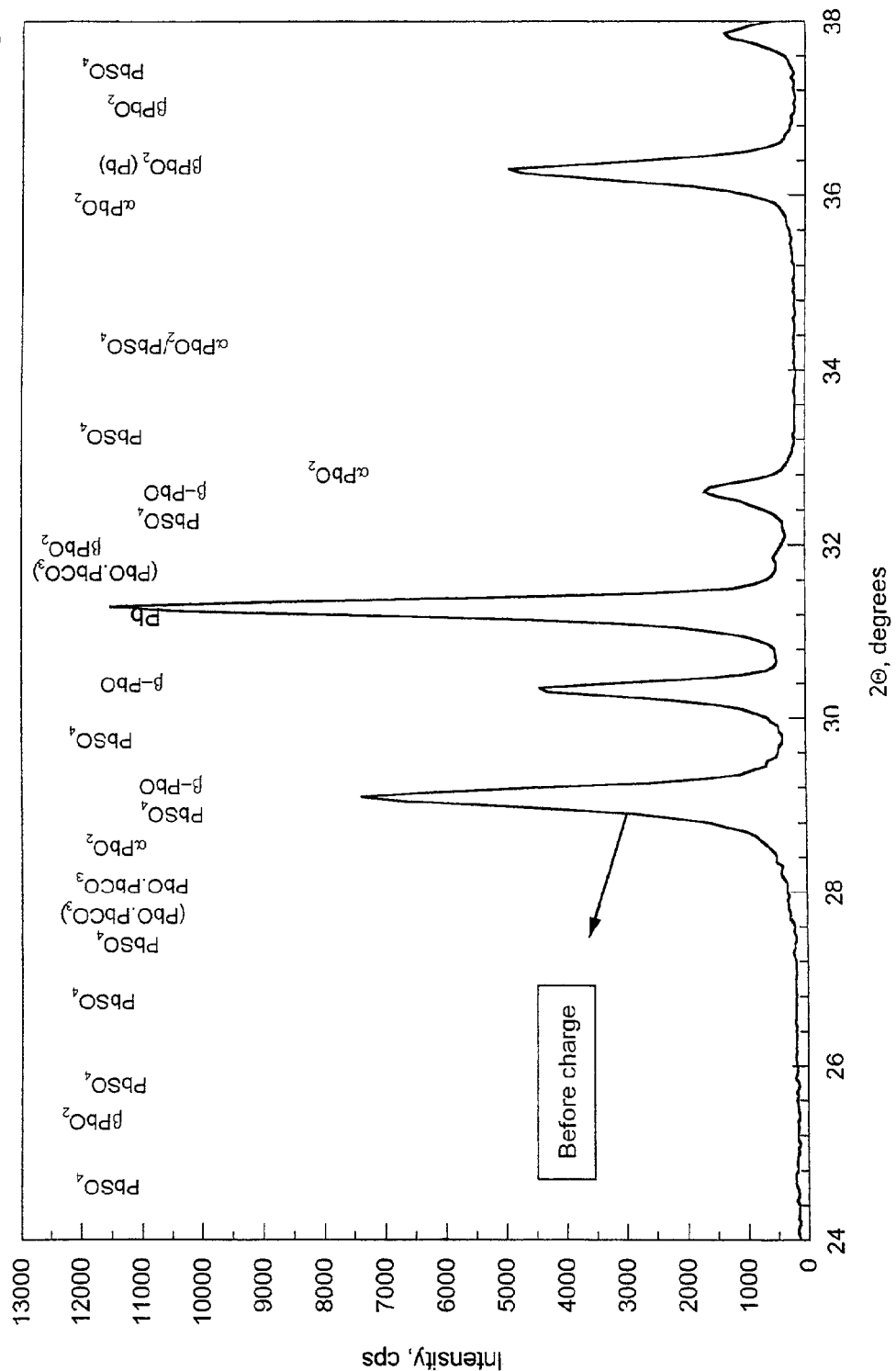
FIG. 13 is an X-ray diffraction scan of a discharged anode plate.
Figure 14:
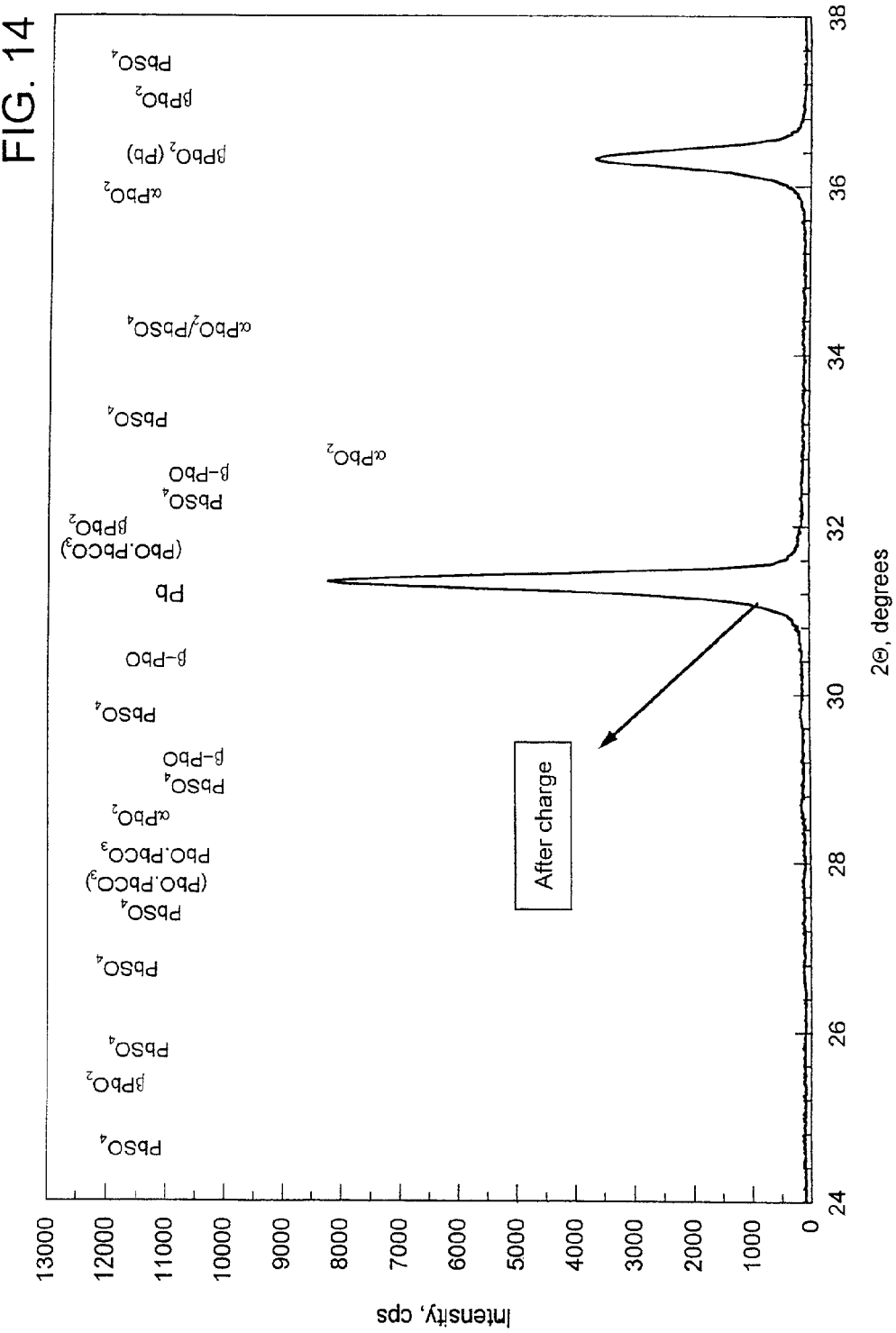
FIG. 14 is an X-ray diffraction scan of a charged anode plate.

FIGS. 13 and 14 are X-ray diffraction scans of the discharged and charged plates, respectively, prepared in the same manner as described in the preceding example. Prior to taking the X-ray diffraction scan, the charged plate was exposed to substantially the same conditions as the charged plate in the preceding example. Compared to FIG. 9, FIG. 14 shows that more lead oxide (PbO) was formed by exposing the electrode material containing glass fibers to air than was formed by exposing a substantially similar plate without glass fibers to air. This indicates that the electrode material containing glass fibers are more reactive toward oxidation than substantially similar plates without glass fibers.

Figure 15:
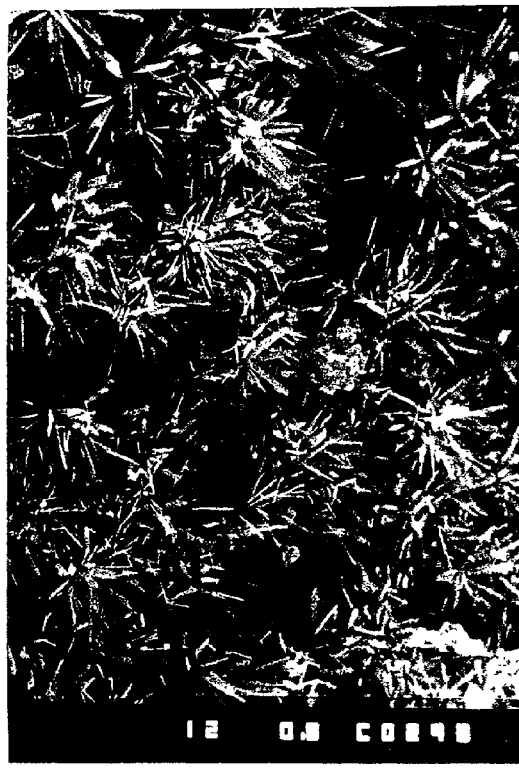
FIG. 15 is a scanning electron micrograph of a discharged anode plate skeleton taken at 800× magnification.
Figure 16:
FIG. 16 is a scanning electron micrograph of a discharged anode plate skeleton taken at 3,000× magnification.

The pure lead component of the negative active material was isolated from the discharged negative plates by dissolution. FIGS. 15 and 16 are scanning electron micrographs of the discharged, isolated negative active material taken at 800× and 3,000× magnification, respectively.

Compared to FIGS. 9–11, FIGS. 14 and 15 show that the pure lead component of the discharged, negative active material from a negative plate containing glass fibers has a more open structure than the pure lead component of the discharged, negative active material from a substantially similar plate without glass fibers. FIGS. 14 and 15 also show that the pure lead components of the discharged, negative active material from a negative plate containing glass fibers has lead crystals with a platelet-like shape.

EXAMPLE 14

A series of six group 31 six cell batteries (Batteries A–F, respectively) were prepared substantially as described in Example 13, but the batteries contained amounts of PA-01 glass fibers (Hollingsworth & Vose Company) in their anodes and cathodes as indicated in Table III (weight percent relative to the amount of lead oxide added to the mixer).

TABLE III

| Battery | Anode | Cathode |
| --- | --- | --- |
| A | 0 wt % | 0 wt % |
| B | 1.5 wt % | 0 wt % |
| C | 3 wt % | 0 wt % |
| D | 0 wt % | 1.5 wt % |
| E | 1.5 wt % | 1.5 wt % |
| F | 3 wt % | 1.5 wt % |

Figure 17:
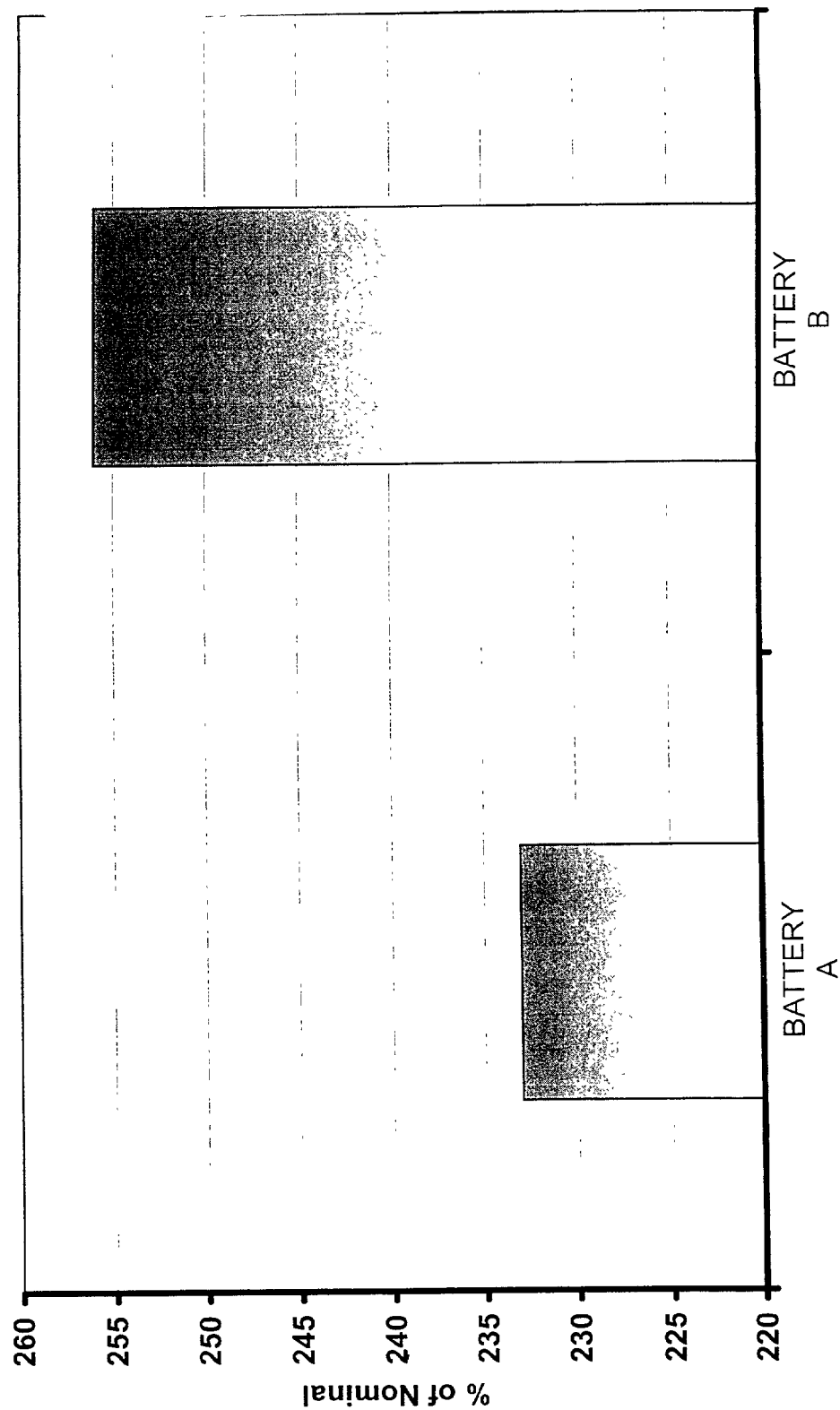
FIG. 17 is a plot of measured nominal charge acceptance for certain batteries.

The charge acceptance of Batteries A and B was measured according to Battery Council International testing procedures as follows. The batteries were discharged to 50% of their capacity; stored at 0° C. for 24 hours; and charged at 14.4 Volts for 10 minutes. The nominal charge acceptance for this test is 22.5 Amps. FIG. 17 shows the percent of nominal charge acceptance (i.e., the percent of 22.5 Amps) measured for Batteries A and B. As shown in FIG. 17, Battery B had a 23% higher measured charge acceptance than Battery A.

Figure 18:
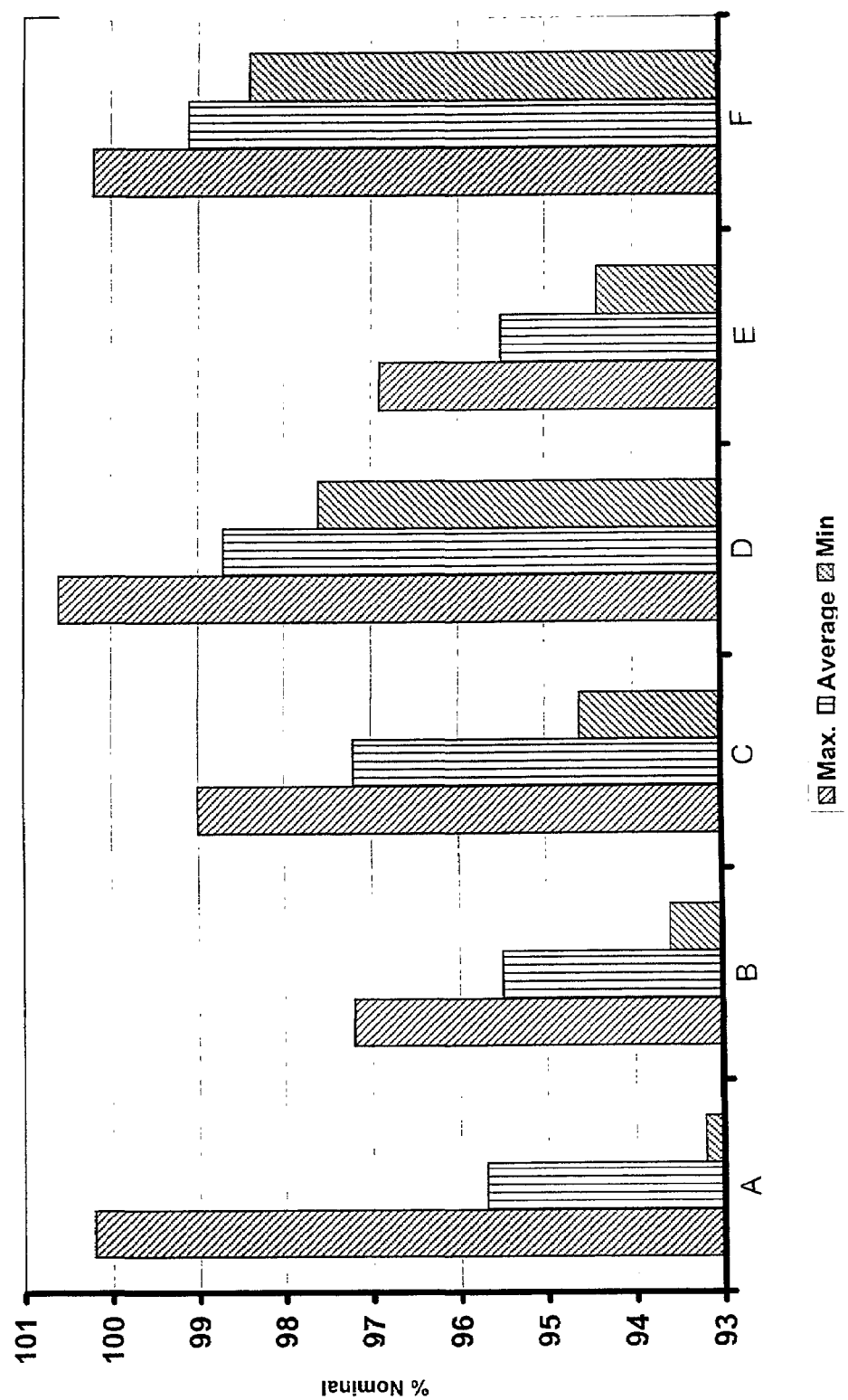
FIG. 18 shows measured nominal reserve capacity values for certain batteries.

The reserve capacity of Batteries A–F was measured as follows. A constant current discharge of 25 Amps was applied to each battery, and the time period for the battery to reach 10.5 Volts was measured. This test multiple times for each battery. The nominal time for this test is 30 minutes. FIG. 18 shows the maximum, average and minimum measured values for each battery.

Figure 19:
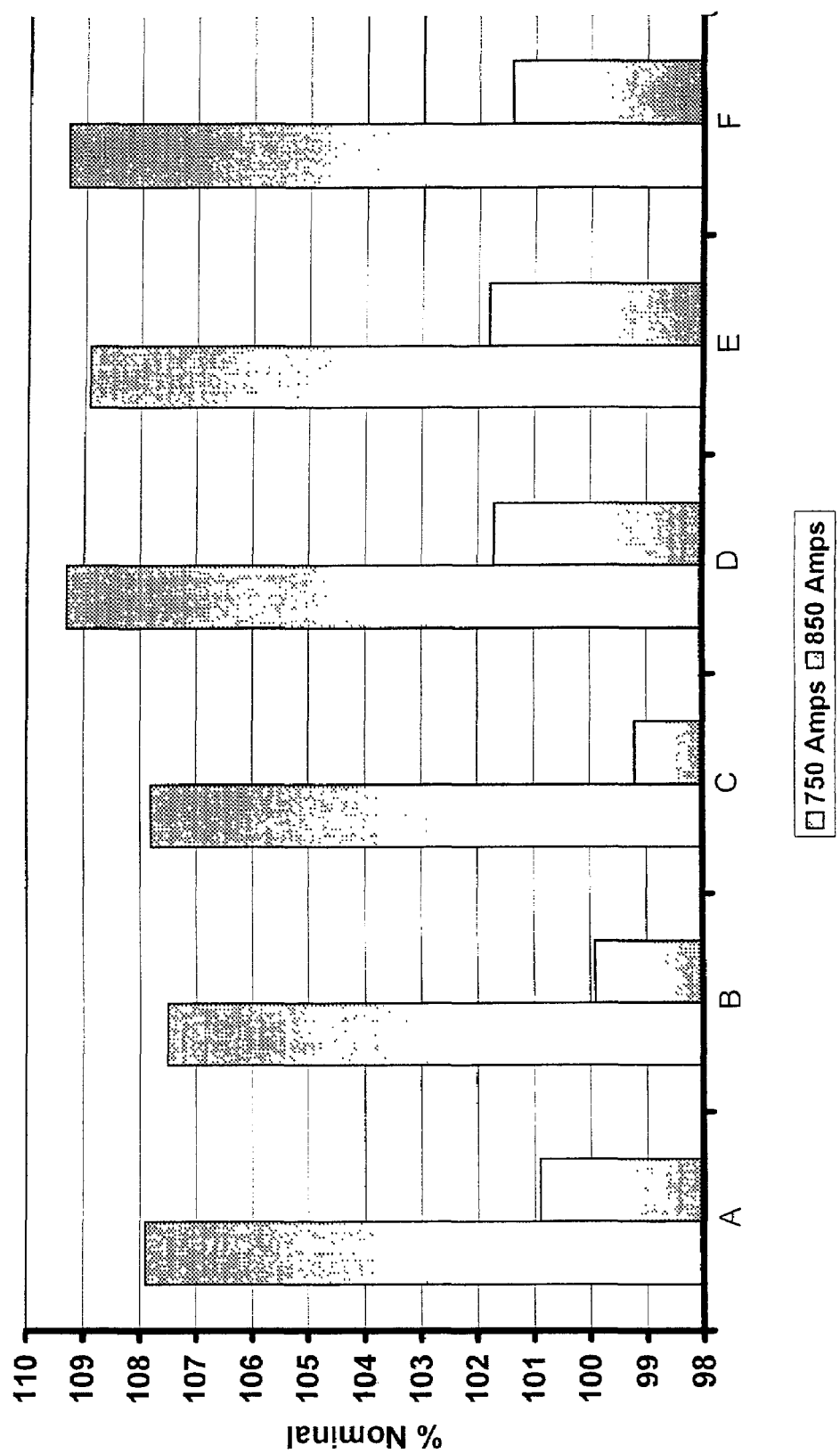
FIG. 19 shows measured nominal cold crank values for certain batteries.

Cold cranking testing was performed on Batteries A–F as follows. Each battery was fully charged, and stored at −18° C. for 24 hours. A discharge of 750 Amps was then applied to each battery, and the voltage was measured at 30 seconds. The nominal end of discharge voltage value for this test is 7.2 Volts. The test was repeated for each battery at a discharge rate of 850 Amps (30 second nominal end of discharge voltage of 7.2 Volts). The results are shown in FIG. 19.

Figure 20:
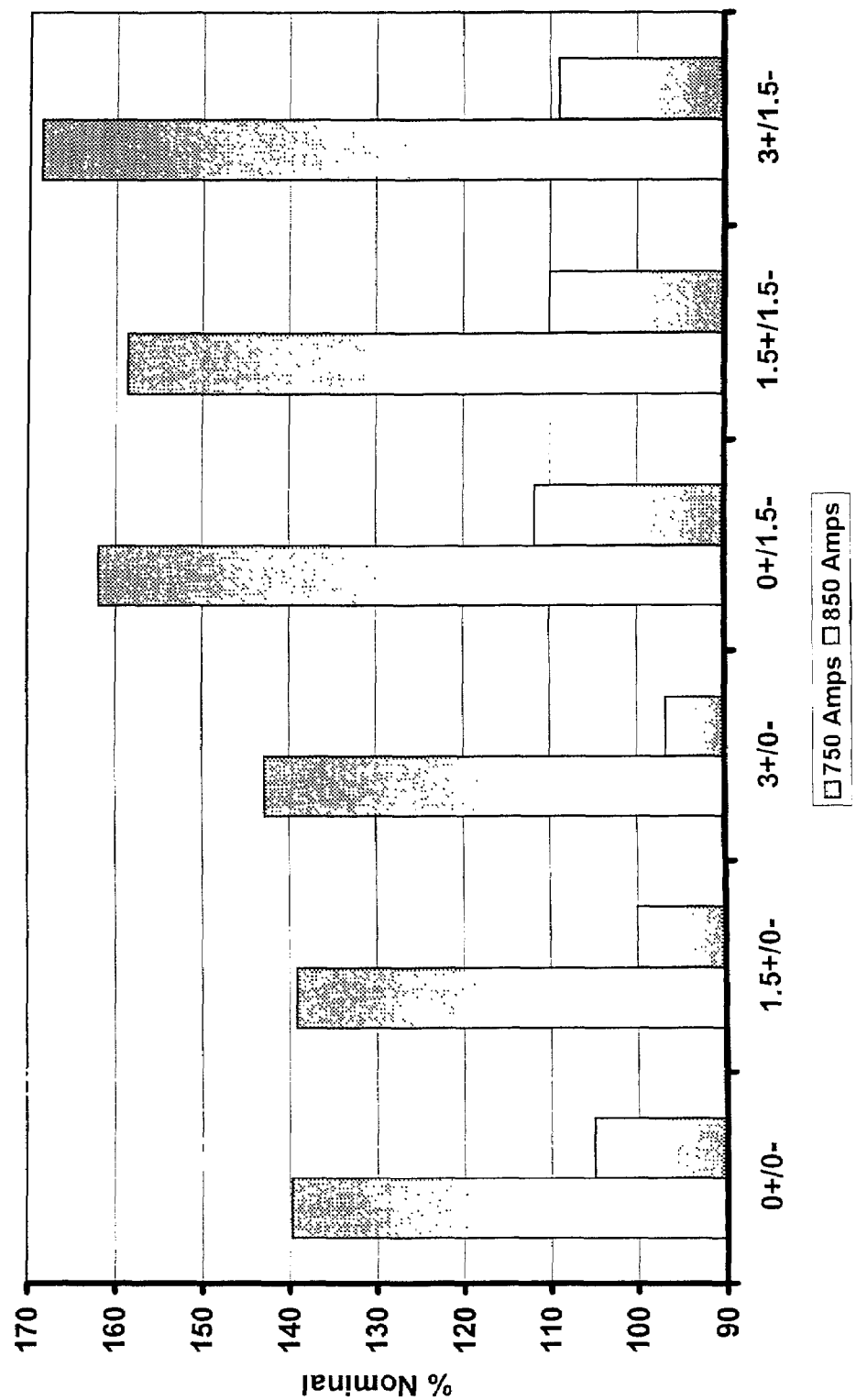
FIG. 20 shows measured nominal cold crank values for certain batteries.

Additional cold cranking testing was performed on Batteries A–F as follows. Each battery was fully charged, and stored at −18° C. for 24 hours. A discharge of 750 Amps was then applied to each battery, and the time period to reach 7.2 Volts was measured. The nominal end of discharge time period for this test is 30 seconds. The test was repeated for each battery at a discharge rate of 850 Amps (7.2 Volts nominal end of discharge time period of 30 seconds). The results are shown in FIG. 20.

EXAMPLE 15

Anode plates for a group 24 lead acid battery (12 Volts, 90 Amp-hours capacity (20 hours)) were prepared as follows.

18.5 pounds of PA-01 glass fibers (Hollingsworth & Vose Company), 12.5 pounds of Hammond expander (Hammond Lead Products) and 40 kilograms of water were sequentially added to the Oxmaster mixer while mixing at 85 revolutions per minute. This combination was mixed for two minutes. 1320 pounds of lead oxide (prepared using the Barton process) and 40 kilograms of water were then sequentially added, and the combination was mixed for two minutes. 125 pounds of aqueous sulfuric acid (specific gravity 1.40) were added, and the resulting combination was mixed for seven minutes.

The resulting paste had a cube weight of 75 grams per cubic inch, a penetration of 15, and a peak temperature of 63° C., a water ratio of 0.133, and an acid ratio of 0.095.

The paste was belt pasted onto grids using a flash dry oven with the following parameters: the pasted plate weight range was 411–441 grams, the thickness range was 0.062–0.065 inch, the plate moisture after drying was seven to eight percent, the drier oven temperature was 350° F., the actual average plate weights was 450 grams, the actual plate moisture after drier oven was 8.2%, and the actual drier oven minimum temperature 260° F.

The plates were further processed using standard techniques, and a group 24 (90 Amp-hrs, VRLA-AGM) lead acid battery was prepared from the plates using standard lead acid battery processing techniques. The cathode was prepared in substantially the same way as the anode, except the cathode did not contain expander or PA-01 glass fibers (Hollingsworth & Vose Company).

EXAMPLE 16

Anode plates for a group 24 lead acid battery (12 Volts, 90 Amp-hours capacity (20 hours), with absorbance glass separators) were prepared as described in the preceding example, except that 18.5 pounds PA-10 glass fibers (Hollingsworth & Vose Company) were used instead of 18.5 pounds of PA-01 glass fibers (Hollingsworth & Vose Company).

The resulting paste had a cube weight of 72 grams per cubic inch, a penetration of 17, and a peak temperature of 64° C., a water ratio of 0.133, and an acid ratio of 0.095.

The paste was belt pasted onto grids using a flash dry oven with the following parameters: the pasted plate weight range was 411–441 grams, the thickness range was 0.062–0.065 inch, the plate moisture after drying was seven to eight percent, the drier oven temperature was 350° F., the actual average plate weights was 452 grams, the actual plate moisture after drier oven was 8.8%, and the actual drier oven minimum temperature 260° F.

A group 24 (90 Amp-hrs, VRLA-AGM) lead acid battery was prepared from the plates using standard lead acid battery processing techniques. The cathode was prepared in substantially the same way as the anode, except the cathode did not contain expander or PA-10 glass fibers (Hollingsworth & Vose Company).

EXAMPLE 17

The plates were further processed using standard techniques, and a group 24 (90 Amp-hrs, VRLA-AGM) lead acid battery was prepared substantially the same was as described in Example 15, except that the anode did not contain PA-01 glass fibers (Hollingsworth & Vose Company).

Capacity (Amp-Hours) and discharge rate (Amps) were measured for this battery (Battery A) and compared to the measurements for two different batteries (Battery B and Battery C, respectively). Battery B was prepared substantially as described in Example 15, except that the anodes contained 1.5 weight percent PA-01 glass fibers (Hollingsworth & Vose Company) relative to the amount of lead oxide added to the mixer during processing. Battery C was prepared substantially as described in Example 16, except that the anodes contained 1.5 weight percent PA-10 glass fibers (Hollingsworth & Vose Company) relative to the lead oxide added to the mixer during processing.

Figure 21:
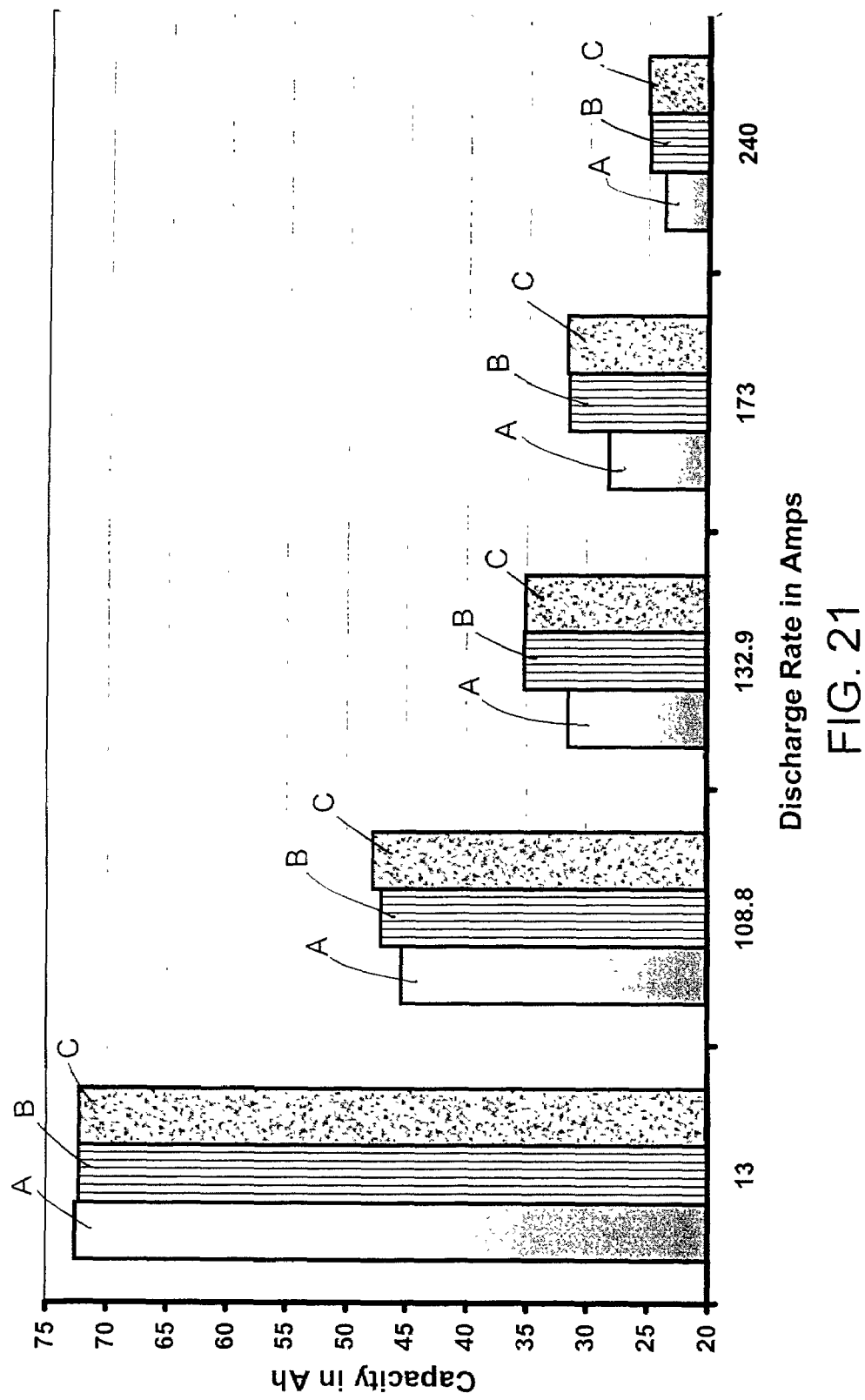
FIG. 21 is a bar graph of the capacity versus discharge rate data for certain batteries.

Table IV shows capacity data (measured in Amp-hours) for the batteries, and Table V shows discharge rate data (measured in Amps) for the batteries. The data in Tables IV and V is based on average values for at least 30 batteries. FIG. 21 shows a bar graph of the capacity (Amp-hours) versus discharge rate (Amps) data for the batteries. The batteries were discharged for five minutes at 240 Amps, for 10 minutes at 173 Amps, for 15 minutes at 132.9 Amps, for 20 minutes at 108.8 Amps, and for 300 minutes at 13 Amps.

TABLE IV

| Battery | 240 Amps | 173 Amps | 132.9 Amps | 108.8 Amps | 13 Amps |
|---------|----------|----------|------------|------------|---------|
| A | 23.6 | 28.2 | 31.5 | 45.4 | 72.6 |
| B | 24.9 | 31.5 | 35.2 | 47.1 | 72.3 |
| C | 25.0 | 31.7 | 35.1 | 47.8 | 72.3 |

TABLE V

| Battery | 240 Amps | 173 Amps | 132.9 Amps | 108.8 Amps | 13 Amps |
|---------|----------|----------|------------|------------|---------|
| A | 5.91 | 9.78 | 14.26 | 25.01 | 335.2 |
| B | 6.22 | 10.92 | 15.90 | 25.97 | 333.5 |
| C | 6.26 | 11.00 | 15.83 | 26.37 | 330.1 |

As shown in Tables IV and V and FIG. 21, batteries having PA-01 or PA-10 glass fibers (Hollingsworth & Vose Company) in their anodes can provide approximately 10% more capacity (Amp-hrs) at high discharge rates (Amps) than a substantially similar battery in which the anodes do not contain glass fibers.

EXAMPLE 18

Anode plates for a group 24 lead acid battery (12 Volts, 90 Amp-hours capacity (20 hours), with absorbance glass separators) were prepared as follows.

20 pounds of PA-20 glass fibers (Hollingsworth & Vose Company), 12.5 pounds of Hammond expander (Hammond Lead Products), 1320 pounds of lead oxide (prepared using the Barton process), and 75 kilograms of water were sequentially added to the Oxmaster mixer while mixing at 85 revolutions. The combination was mixed for two minutes, and then 125 pounds of aqueous sulfuric acid were added while mixing. This combination was mixed for seven minutes.

The resulting paste had a maximum temperature during preparation of 61° C., a cube weight of 72.4 grams per cubic inch, a penetration of 17, a water ratio of 0.125, and an acid ratio of 0.095.

The paste was belt pasted onto grids using a flash dry oven with the following parameters: the pasted plate weight range was 544–574 grams (double), the thickness range was 0.079–0.083 inch, the plate moisture after drying was seven to eight percent, the actual plate moisture after drier oven was 9.2%, and the actual drier oven minimum temperature 400° F.

The plates were further processed using standard techniques, and a group 24 lead acid battery was prepared from the plates using standard lead acid battery processing techniques.

While certain embodiments have been described, the invention is not limited to these embodiments.

As an example, while glass fibers having an average length of from 0.1 millimeter to 1.5 millimeter have been described, other types of fibers with an average length of from 0.1 millimeter to 1.5 millimeters can be used. In general, such fibers can be siliceous fibers or non-siliceous fibers, synthetic fibers or nonsynthetic fibers, organic fibers or inorganic fibers, polymeric fibers or nonpolymeric fibers, coated fibers or substantially noncoated fibers, hollow fibers or substantially nonhollow fibers, porous fibers or substantially nonporous fibers, metallic fibers or nonmetallic fibers, or combinations thereof. Examples of types of polymeric fibers include substituted polymers, unsubstituted polymers, saturated polymers, unsaturated polymers (e.g., aromatic polymers), organic polymers, inorganic polymers, straight chained polymers, branched polymers, homopolymers, copolymers, and combinations thereof. Examples of polymer fibers include polyalkylenes (e.g., polyethylene, polypropylene, polybutylene), polyesters (e.g., polyethylene terephthalate), polyamides (e.g., nylons, aramids), halogenated polymers (e.g., teflons) and combinations thereof. Examples of other types of fibers include metallic fibers (e.g., fibers formed of materials containing transition metals or transition metal alloys), ceramic fibers (e.g., fibers formed of materials containing one or more metal oxides, such as titanate fibers), metal coated fibers, alloy coated fibers, sulfide fibers, carbon fibers (e.g., graphite fibers), and combinations thereof.

As another example, while the supports for the paste have been illustrated as grids having certain patterns, the supports are not so limited. The supports can be formed of a grid having any desired design. More generally, the support need not be in the form of a grid. For example, the support can be solid. Moreover, the supports can be formed of various electrically conductive material, which need not contain lead.

Other embodiments are in the claims.

The invention claimed is:

1. A method of modifying a plurality of fibers, comprising:
   applying pressure at more than one angle to the plurality of fibers,
   wherein the plurality of fibers has an average length of greater than 1.5 millimeters before applying pressure and an average length of less than 1.5 millimeters after applying pressure, the pressure is sequentially applied at more than one angle, and the plurality of fibers is rotated between sequential steps of applying pressure.

2. The method of claim 1, wherein the pressure is at least 50 pounds per square inch.

3. The method of claim 1, wherein the plurality of fibers comprise a plurality of glass fibers.

4. The method of claim 1, wherein the first average length is at least five millimeters.

5. The method of claim 1, wherein pressure is applied for at least one second.

6. The method of claim 1, wherein the second average length is less than 0.5 millimeter.

7. The method of claim 1, wherein after applying pressure the plurality of fibers has an acid absorption of less than 1350%.

8. The method of claim 1, wherein the plurality of fibers comprise a plurality of C glass fibers.

9. A method of modifying a plurality of fibers, comprising:
   applying pressure to the plurality of fibers,
   wherein the plurality of fibers has a first average length before applying pressure and a second average length after applying pressure, the first average length being at least 15 times greater than the second average length, and
   wherein pressure is sequentially applied at more than one angle.

10. The method of claim 9, wherein the first average length is at least 20 times the second average length.

11. The method of claim 9, wherein the first average length is at least 25 times the second average length.

12. The method of claim 9, wherein the plurality of fibers is rotated between sequential steps of applying pressure.

13. The method of claim 9, wherein the pressure is at least 50 pounds per square inch.

14. The method of claim 9, wherein the plurality of fibers comprise a plurality of glass fibers.

15. The method of claim 9, wherein the first average length is at least five millimeters.

16. The method of claim 9, wherein pressure is applied for at least one second.

17. The method of claim 9, wherein the second average length is less than 1.5 millimeter.

18. The method of claim 9, wherein after applying pressure the plurality of fibers has an acid absorption of less than 1350%.

19. The method of claim 9, wherein the plurality of fibers comprise a plurality of C glass fibers.

20. A method of modifying a plurality of fibers, comprising:
   applying a first pressure to the plurality of fibers;
   removing the first pressure from the plurality of fibers;
   rotating the plurality of fibers; and
   applying a second pressure to the plurality of fibers,
   wherein the plurality of fibers has a first average length before applying the first pressure and a second average length after applying the second pressure, the first average length being greater than the second average length.

21. The method of claim 20, wherein a pressure selected from the group consisting of the first pressure and the second pressure is at least 50 pounds per square inch.

22. The method of claim 20, wherein the plurality of fibers comprise a plurality of glass fibers.

23. The method of claim 20, wherein the first average length is at least five millimeters.

24. The method of claim 20, wherein a pressure selected from the group consisting of the first pressure and the second pressure is applied for at least one second.

25. The method of claim 20, wherein the second average length is less than 1.5 millimeters.

26. The method of claim 20, wherein after applying pressure the plurality of fibers has an acid absorption of less than 1350%.

27. The method of claim 20, wherein the plurality of fibers comprise a plurality of C glass fibers.

* * * * *